(12) United States Patent
Annibale et al.

(10) Patent No.: US 11,294,163 B2
(45) Date of Patent: Apr. 5, 2022

(54) AUTOFOCUS-CONTROL OF A MICROSCOPE INCLUDING AN ELECTRICALLY TUNABLE LENS

(71) Applicant: Max-Delbrück-Centrum für Molekulare Medizin in der Helmholtz-Gemeinschaft, Berlin (DE)

(72) Inventors: Paolo Annibale, Berlin (DE); Marc Bathe-Peters, Berlin (DE); Martin Lohse, Würzburg (DE)

(73) Assignee: Max-Delbrück-Centrum für Molekulare Medizin in der Helmholtz-Gemeinschaft, Berlin (DE)

( * ) Notice: Subject to any disclaimer, the term of this patent is extended or adjusted under 35 U.S.C. 154(b) by 19 days.

(21) Appl. No.: 16/641,470

(22) PCT Filed: Oct. 18, 2018

(86) PCT No.: PCT/EP2018/078525
§ 371 (c)(1),
(2) Date: Feb. 24, 2020

(87) PCT Pub. No.: WO2019/081333
PCT Pub. Date: May 2, 2019

(65) Prior Publication Data
US 2020/0301124 A1   Sep. 24, 2020

(30) Foreign Application Priority Data

Oct. 23, 2017 (EP) .................................... 17197757

(51) Int. Cl.
*G02B 21/24* (2006.01)
*G02B 7/28* (2021.01)
(Continued)

(52) U.S. Cl.
CPC .......... *G02B 21/245* (2013.01); *G02B 7/287* (2013.01); *G02B 21/361* (2013.01); *G02F 1/29* (2013.01); *G02F 1/294* (2021.01)

(58) Field of Classification Search
CPC ...... G02F 1/29; G02F 1/294; G02F 1/134309; G02F 1/292; G02F 1/133371;
(Continued)

(56) References Cited

U.S. PATENT DOCUMENTS 5,260,562 A * 11/1993 Bearden ............... G02B 21/002
                                                                    250/216
8,010,237 B2    8/2011 Cheung et al.
(Continued)

FOREIGN PATENT DOCUMENTS

EP          2 952 850 A1    12/2015
WO     2003/060589 A1     7/2003
(Continued)

OTHER PUBLICATIONS

Zhaojun Wang et al: "Compact multi-band fluorescent microscope with an electrically tunable lens for autofocusing", Biomedical Optics Express, vol. 6, No. 11, Nov. 1, 2015 (Nov. 1, 2015), p. 4353, XP055466628, United States ISSN: 2156-7085, DOI: 10.1364/BOE.6.004353 (Year: 2015).*

(Continued)

*Primary Examiner* — William R Alexander
*Assistant Examiner* — Sharrief I Broome
(74) *Attorney, Agent, or Firm* — DLA Piper LLP (US)

(57) ABSTRACT

A microscope-autofocus device for feedback-controlling a focal position of an imaging system of a microscope apparatus, wherein the imaging system includes a microscope objective, a monitoring beam source for creating a monitoring beam, a detector device for detecting a drift variation of an axial objective distance between the microscope (Continued)

objective and a sample by sensing the monitoring beam directed through the imaging system to the sample and reflected by the sample, and a feedback loop device for controlling the imaging system in dependency on the detected objective distance variation of the microscope objective.

22 Claims, 13 Drawing Sheets

(51) Int. Cl.
*G02B 21/36* (2006.01)
*G02F 1/29* (2006.01)

(58) Field of Classification Search
CPC ............. G02F 2203/28; G02F 2202/20; G02F 2202/30; G02F 2203/18; G02F 1/0147; G02F 1/03; G02F 1/133553; G02F 1/13471; G02F 2203/12; G02F 1/0128; G02F 1/0305; G02F 1/0316; G02F 1/055; G02F 1/11; G02F 1/13; G02B 3/14; G02B 26/0825; G02B 26/0875; G02B 26/127; G02B 26/004; G02B 26/10; G02B 7/08; G02B 17/0694; G02B 26/005; G02B 27/017; G02B 5/1895; G02B 13/0075; G02B 15/04; G02B 25/001; G02B 26/001; G02B 26/06; G02B 26/128; G02B 27/0025; G02B 27/005; G02B 27/56; G02C 7/083; G02C 7/101; G02C 2202/20; G02C 7/06; G02C 2202/18; G02C 7/061; G02C 2202/22; G02C 2202/16; G02C 7/14; G02C 7/048; H04N 9/3105; H04N 1/1135; H04N 13/305; H04N 1/00132; H04N 1/00143; H04N 1/00167; H04N 1/00188; H04N 1/028; H04N 1/0402; H04N 1/0408; H04N 1/0446; H04N 1/053; H04N 1/12; H04N 1/40037; H04N 1/60; H04N 2201/02439; H04N 2201/0471; H04N 2201/04732; H04N 2201/04744; H04N 2201/04772
See application file for complete search history.

(56) References Cited

U.S. PATENT DOCUMENTS

| | | | |
|---|---|---|---|
| 2003/0058530 A1* | 3/2003 | Kawano | G02B 21/002 359/385 |
| 2010/0207039 A1* | 8/2010 | Ulcinas | B82Y 20/00 250/492.1 |
| 2013/0070334 A1* | 3/2013 | Kim | G02B 7/38 359/379 |
| 2016/0202462 A1* | 7/2016 | Levecq | G02B 21/06 250/459.1 |
| 2016/0327779 A1* | 11/2016 | Hillman | G02B 21/0052 |
| 2017/0153436 A1* | 6/2017 | Park | G02B 21/33 |

FOREIGN PATENT DOCUMENTS

| | | |
|---|---|---|
| WO | 2015/197601 A1 | 12/2015 |
| WO | 2017/177180 A1 | 10/2017 |

OTHER PUBLICATIONS

Li, Sihong et al., "High Resolution Autofocus for Spatial Temporal Biomedical Research," Review of Scientific Instruments, 84, 114302, Nov. 14, 2013.
Frigault, Melanie M. et al., "Life-Cell Microscopy—Tips and Tools," Journal of Cell Science, 122 (Pt 6):753-767, 2009.
Yazdanfar, Siavash et al., "Simple and Robust Image-Based Autofocusing for Digital Microscopy," Optics Express, 16 (12):8670-8677, Jun. 9, 2008.
Liron, Y. et al., "Laser Autofocusing System for High-Resolution Cell Biological Imaging," Journal of Microscopy, 221 (2):145-151, Feb. 2006.
Blum, M. et al., "Compact Optical Design Solutions Using Focus Tunable Lenses," Proc. of SPIE, 8167:81670W-1-81670W-9, 2011.
Annibale, Paolo et al., Electrically Tunable Lens Speed Up 3D Orbital Tracking, Biomedical Optics Express, 6 (6):2181-90, May 21, 2015.
Wang, Zhaojun et al., Compact Multi-Band Fluorescent Microscope with an Electrically Tunable Lens for Autofocusing, Biomedical Optics Express, 6 (11):4353-64, Oct. 14, 2015.
Chinese Official Action dated Aug. 4, 2021 in counterpart Chinese Application No. 201880068621.X, along with an English translation.
Chinese Official Action dated Aug. 4, 2021 by the Chinese Patent Office in corresponding Chinese Application No. 201880068621.X. No English translation.

* cited by examiner

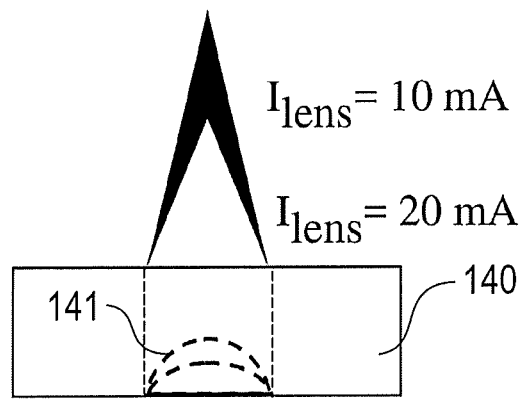
FIG. 2
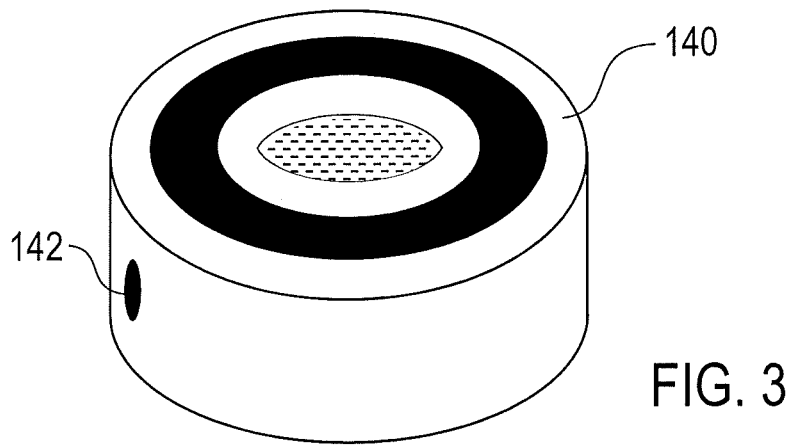
FIG. 3
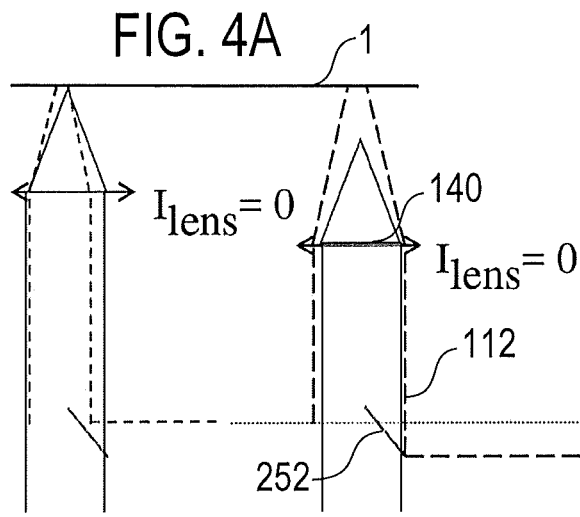
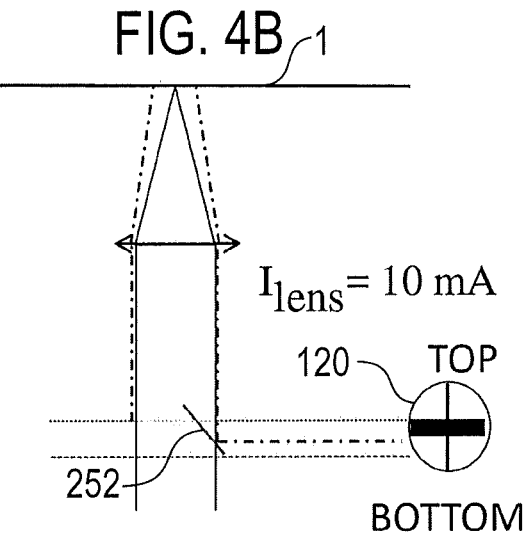
$$QPD\ (V) = \frac{TOP - BOTTOM}{TOP + BOTTOM}$$

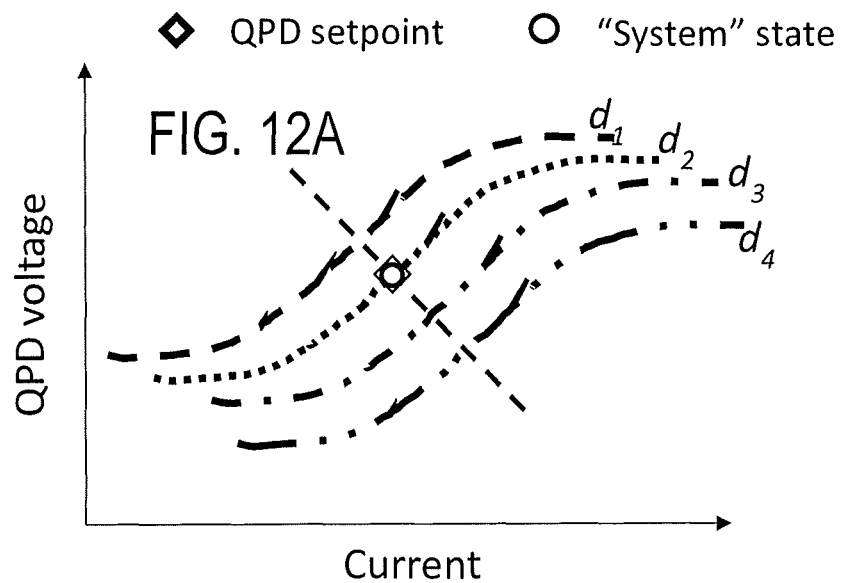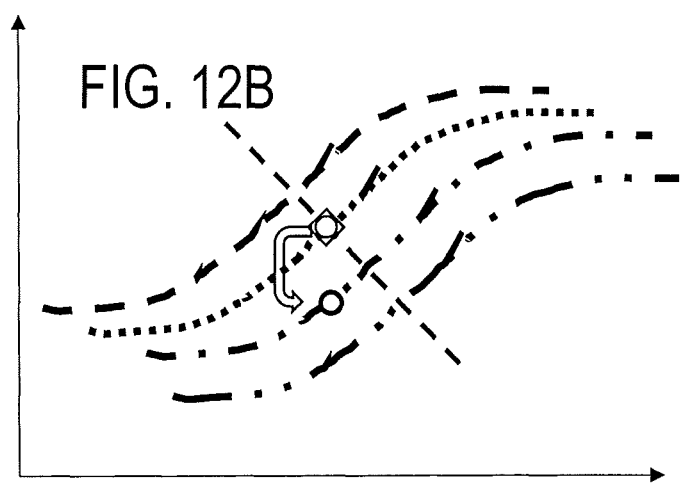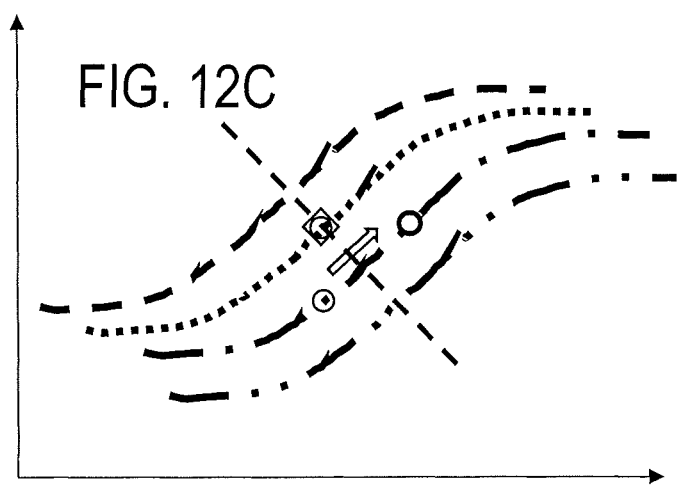

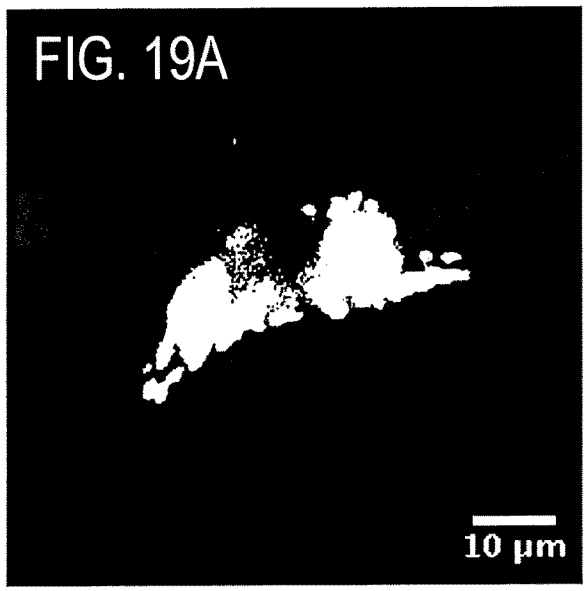
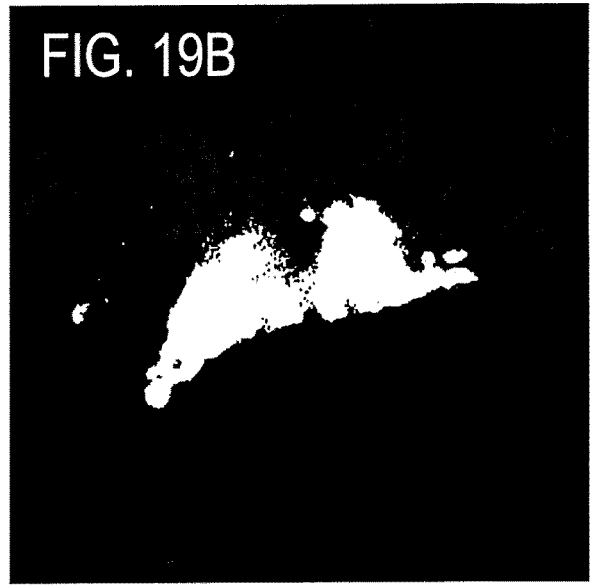
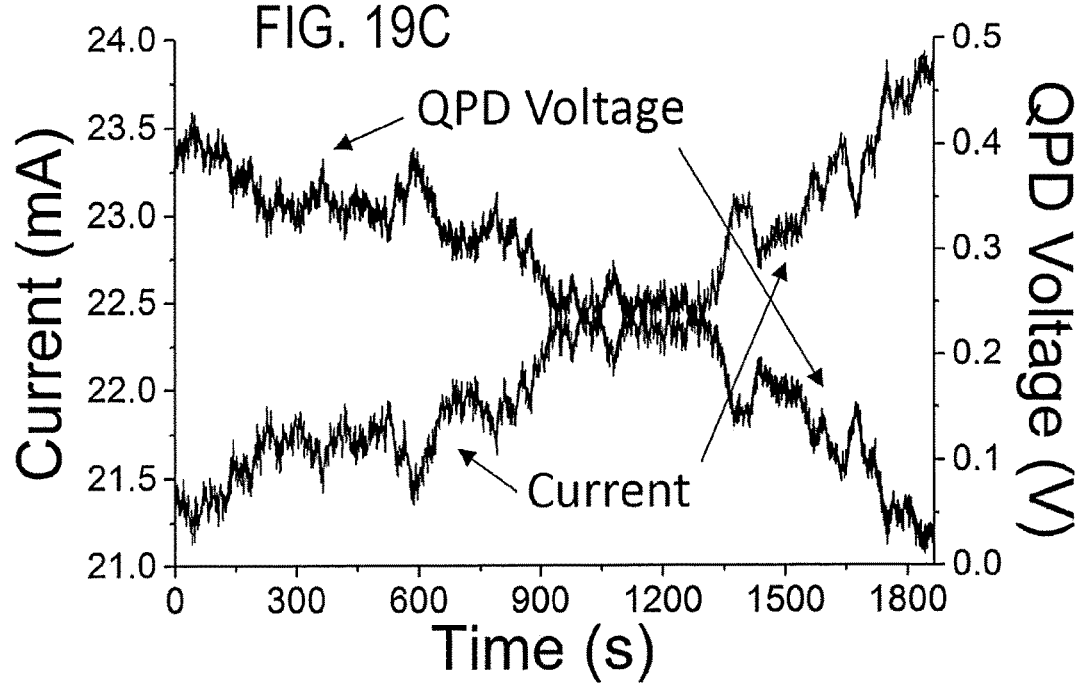

AUTOFOCUS-CONTROL OF A MICROSCOPE INCLUDING AN ELECTRICALLY TUNABLE LENS

FIELD OF THE DISCLOSURE

The disclosure relates to an autofocus device (microscope autofocus device), being adapted for feedback-controlling a focal position of an imaging system of a microscope, in particular using a monitoring beam directed through the imaging system. Furthermore, the disclosure relates to a microscope including the autofocus device, to an autofocus-control method and to a microscopy method, including an autofocus-control of the imaging system. Applications of the disclosure are available in all modes of optical microscopy.

TECHNICAL BACKGROUND

Microscopic imaging of biological samples over long time scales (minutes to hours) at cellular or molecular levels requires that the microscope can keep the sample in focus. Maintaining the sample in focus is a critical challenge: mechanical and thermal fluctuations as well as thermal instability of the microscope body all contribute to drift variations of the distance between the microscope objective and the sample, resulting in focus drifts. These can disrupt e. g. single molecule imaging or super resolution microscopy, even over short periods. To oppose these inevitable fluctuations it is important to use automatic focal plane detection and stabilization devices and methods (autofocus devices and methods).

In conventional microscopy, two basic types of autofocus systems are used, which are either based on software focusing algorithms which analyse and compare in focus and out of focus images (image analysis based autofocus) or on optical approaches which measure the actual objective to sample distance (monitoring beam based autofocus).

The image analysis based autofocus systems detect a focal position drift by analysing image parameters of the collected microscopic image. The focal position is adjusted for compensating the detected focal position drift. Due to the following limitations, the image analysis based autofocus systems have a restricted application range. Firstly, they cannot be applied with microscopy modes that do not collect images continuously, like fluorescence correlation or scanning microscopy modes. Furthermore, some types of samples do not allow a fast and reliable image analysis, like diffuse samples without sharp edges of image details. Finally, image analysis based autofocus systems do not allow an instant, continuous autofocus control as the image analysis is time consuming and as the result the rate of mechanically adjusting the microscope objective is limited.

It has been proposed to combine the image analysis based autofocus system with an electrically tunable lens (ETL) paired to the microscope objective. The ETL provides an effective optical focal distance modulator replacing the mechanical adjustment of the microscope objective. As an example, employs information based on the analysis of the microscopic image for controlling the ETL with fixed setpoint values. Various types of ETLs are known, like e. g. an ETL which includes a deformable membrane with an adjustable curvature determining the focal length of the ETL. According to, the instant focal length can be measured by employing a light source and a photodetector being integrated with the ETL. The light source creates a light beam, which is deflected via the membrane surface to the photodetector. The photodetector output signal, which is determined by the curvature of the membrane surface provides closed loop feedback control of the focal length. The application of the feedback control of is restricted to the automatic control of the ETL as such, and it does not allow an autofocus control of a microscope objective relative to a sample.

The monitoring beam based autofocus systems typically employ a near-infrared laser or light emitting diode that emits a monitoring beam through the microscope objective. The monitoring beam is reflected by a sample glass coverslip onto an optical detection system. As the monitoring beam position or pattern is sensitive to any displacement between the sample surface and the monitoring beam, the focal displacement can be quantified by an output signal of the optical detection system. As a disadvantage of this autofocus system, the optical detection system has to be placed in the microscope body as near as possible to the objective as the normally reflected monitoring beam is diverging, the power of the reflected beam decaying as $1/(\text{distance}^2)$ from the sample. Furthermore, controlling conventional monitoring beam based autofocus systems is restricted to the use of mechanical adjustments of the microscope objective. This is generally achieved by a piezoelectric stage which typically is expensive, or by mechanical objective actuators which are relatively slow, e. g. with a reciprocal response time in a frequency range of 1-10 Hz. Despite of the advantages of an ETL, which would not require any targeted mechanical objective-sample displacement for adjusting the focal position, monitoring beam based autofocus systems using an ETL adjustment have not been described up to now.

In summary, conventional and commercial autofocus systems are largely based on piezoelectric stages or mechanical objective actuators. Objective to sample distance is either measured by image analysis approaches or by hardware modules measuring the intensity of reflected infrared light. In all cases, relative mechanical movement between the objective and the sample cannot be avoided in order to maintain the focus. Applications of ETLs for focal position adjustment are restricted to the image analysis based autofocus systems.

The above problems do not occur only with microscopic imaging of biological samples, but also with other types of samples, like e. g. non-biological material samples or microsystems under microscopic control.

SUMMARY

A summary of the disclosure is to provide an improved microscope-autofocus device for feedback-controlling a focal position of a microscope imaging system and an improved autofocus-control method, being capable of avoiding limitations of conventional techniques, and in particular being capable of providing the autofocus control with increased speed, reduced structural complexity, absence of mechanical lens translations, in particular resulting in reduced costs, improved reliability and/or extended applications with various microscopy modes and/or types of samples. Furthermore, the object of the disclosure is to provide an improved microscope apparatus and an improved microscopy method using the microscope-autofocus device, being capable of avoiding limitations of conventional techniques.

BRIEF DESCRIPTION OF THE DRAWINGS

Further details and advantages of the disclosure are described in the following with reference to the attached drawings, which show in:

FIG. 2: schematic illustrations of an ETL, showing different ETL curvatures and focal points for different lens control inputs;

FIG. 3: a schematic perspective view of an ETL and its enclosing holder;

FIGS. 4A and 4B: illustrations of the working principle of adjusting the ETL and detecting the monitoring beam;

FIGS. 12A to 12F: an illustration of successive phases of set-point ramping employed according to the disclosure; and FIGS. 13 to 19C: experimental results obtained with the inventive microscope autofocus device and method.

DETAILED DESCRIPTION

Figure 1:
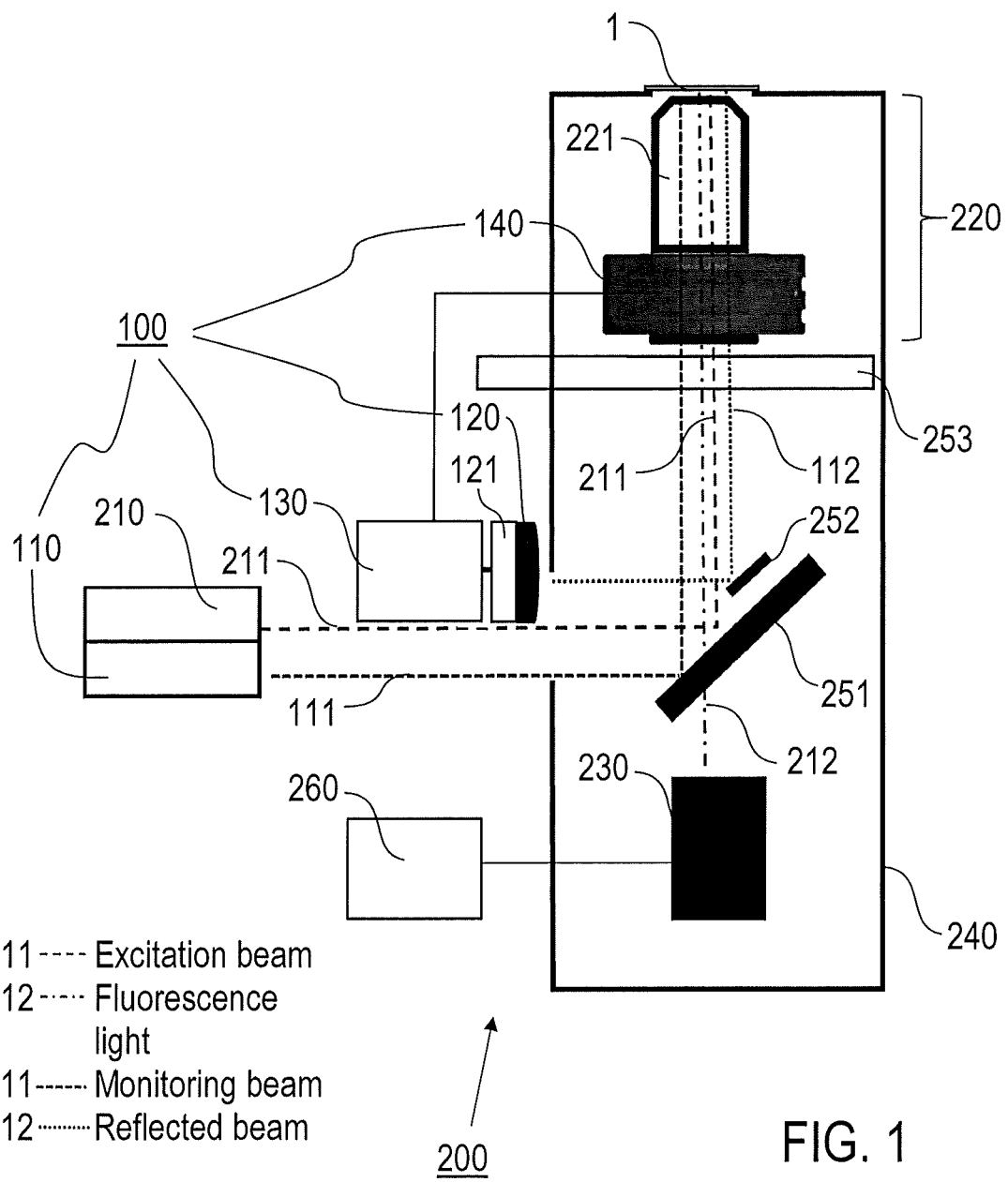
FIG. 1: a schematic illustration of the beam paths in a preferred embodiment of the microscope including an autofocus device according to the disclosure.

These objects are correspondingly solved by a microscope-autofocus device, a microscope apparatus, an autofocus-control method and a microscopy method, comprising the features of the respective independent claims. Preferred embodiments and applications of the disclosure arise from the dependent claims.

According to a first general aspect of the disclosure, the above object is solved by a microscope-autofocus device, which is configured for feedback-controlling a focal position of an imaging system (or: imaging optics) of a microscope. The microscope-autofocus device is adapted for controlling an optical microscope having an imaging system, which includes a microscope objective. The microscope-autofocus device comprises an electrically tunable lens (ETL) being configured for coupling with the microscope objective. The microscope objective preferably has a fixed focal length, and the focal position of the imaging system can be set by adjusting the ETL of the microscope-autofocus device.

According to the disclosure, the microscope-autofocus device comprises a monitoring beam source, a detector device, a feedback loop device and the ETL. Furthermore, the microscope-autofocus device may include an autofocus control unit, which is adapted for controlling the microscope-autofocus device operation. The autofocus control unit can be provided with the feedback loop device as a common circuit, or integrated in a microscope control unit or provided as a separate circuit.

The monitoring beam source is a light source being adapted for creating a monitoring beam. The monitoring beam is a light beam, preferably having a wavelength different from the wavelength or wavelength range used for microscopic imaging with the microscope. Advantageously, this allows to operate the autofocus control independently of the sample illumination for the microscopic imaging. Preferably, the monitoring beam is a laser beam or another collimated beam, e. g. emitted by a light emitting diode. For example, the monitoring beam is an IR or near IR beam for UV or visible light microscopy, or a visible light beam for UV microscopy. The monitoring beam source, optionally in combination with deflecting optics, is arranged in a microscope body or outside thereof for directing the monitoring beam through the imaging system to the sample. Preferably, the monitoring beam source is configured for creating the monitoring beam with a diameter in a range from 0.5 mm to 2.5 mm. Advantageously, the precision of detecting the monitoring beam is optimised with this diameter range.

The detector device is a photodetector being arranged for sensing the monitoring beam directed through the imaging system to the sample and reflected by the sample (in particular the sample glass support, in the following: coverslip) and for detecting a drift variation of an axial objective distance between the microscope objective and the sample, in particular the coverslip (in the following: objective distance) by sensing the reflected monitoring beam. The objective distance is the distance between the sample, in particular the coverslip, and the microscope objective, e. g. a fixed surface thereof, along the imaging axis of the microscope. The objective distance is determined by the axial position of the microscope objective relative to the fixed sample. The detector device is adapted for creating a detector device output, which is determined by the current objective distance, i. e. by the current axial position of the microscope. The drift variation (or: objective distance variation, drift focal position) comprises an accidental change of the objective distance due to mechanical and/or thermal fluctuations, e. g. of the microscope body, an imaging system support, the imaging system as such, a sample support or other microscope components. The objective distance can drift by a geometric, thermal and/or optical effect (change of optical beam path length between imaging system and sample, e. g. by a change in refractive index of the medium between objective and sample). The objective distance can also change in dependence of deliberate modifications of the position of the sample relative to the imaging system. The drift variation results in a characteristic change of the detector device output, and it covers a predetermined drift variation interval depending on the structure and operation conditions of the microscope.

The feedback loop device comprises a control device, like a control circuit, which is adapted for controlling the optical properties of the imaging system in dependency on the detected objective distance variation of the microscope objective. The feedback loop device is coupled with the detector device for receiving the detector device output, and it is adapted for creating a control output to be supplied to the imaging system. The feedback loop device incudes a control characteristic creating the control output in dependency on the detector device output and a setpoint value for focal position adjustment.

The ETL (or: "electrical lens") is any optical lens, which is configured for focusing or diverging a light beam, such as a continuous or pulsed light beam, by deforming at least one lens surface. A curvature of the at least one lens surface specifically determines the focal length of the lens. The ETL is configured for deforming the at least one lens surface in response to an electrical lens control input signal. The lens control input is an input current or any other input signal which changes the focal length of the ETL. The focal length of the ETL is changed by deforming the refracting lens body but without translating the lens body.

Preferably, the ETL is adapted for a linear response to the lens control input, i. e. the lens control input changes the focal length in a linear way. Advantageously, this facilitates the provision of calibration data. However, the disclosure also works with a non-linear response of the ETL to the lens control input value, if the calibration data are adapted in accordance with the non-linear response of the ETL.

The ETL is adapted for optical coupling with the microscope objective, i. e. it is adapted to be arranged as a part of the imaging system in the imaging axis of the microscope. When the microscope-autofocus device is added to the microscope apparatus, the ETL may be solidly coupled with the microscope objective, i. e. the ETL may be connected to the microscope objective or even integrated as a lens component into the microscope objective. Advantageously, this provides a compact imaging system. Alternatively, the ETL may be coupled with the microscope objective in an exchangeable manner. In particular, the ETL can be arranged with a distance from the microscope objective as a separate optical component along the imaging axis of the microscope. Advantageously, this allows an exchange of the ETL, e. g. in dependency on a microscopy imaging task.

According to the disclosure, the microscope-autofocus device is adapted for controlling the ETL being included in the imaging system and being capable of adjusting the focal position of the imaging system by varying the lens control input. The ETL is capable of changing the focal position in a range covering at least the potential drift variation interval. In particular, the feedback loop device is adapted for controlling the ETL, preferably for directly creating the control output as the lens control input of the ETL.

As a first main advantage of the disclosure, adapting the microscope-autofocus device for controlling the ETL allows a truly all-optical microscope autofocus taking advantage of the ETL in terms of effective focal distance modulation, low costs, high focussing speed and avoiding mechanically moved components in a monitoring beam based autofocus configuration.

Furthermore, according to the disclosure, the feedback loop device is adapted for controlling the lens control input of the ETL on the basis of a varying set-point value, which is determined by actual values of the detected objective distance variation and the lens control input and by calibration data derived from the mutual relationship of detector device output values to objective distance variation values and lens control input values. The calibration data are derived from an assignment of the detector device output values to objective distance variation values and lens control input values, and they are obtained with a calibration procedure or by numerical simulation of the optical properties of the microscope or by a prestored table of reference values. Preferably, the feedback loop device is coupled with a calibration data storage, which is adapted for storing the calibration data. In particular, the calibration data storage can be included in the feedback loop device, the autofocus control unit or a main microscope control device.

As a second main advantage of the disclosure, using the varying set-point value allows a monitoring beam based control of the ETL, so that the above disadvantages of image analysis based methods can be avoided. With more details, the inventors have found that using a conventional monitoring beam based autofocus system in combination with an ETL would result in an obstacle for a reliable ETL control as both of an objective distance variation and a lens control input change influence the monitoring beam (and thus the detector device output) independently of each other, so that the autofocus control with a fixed set-point is impossible. Furthermore, the inventors have found that this obstacle can be avoided if the feedback control includes a control characteristic with the varying set-point value and that calibration data can be provided (by measurement and/or numerical simulation) for determining the varying set-point value.

As a third main advantage of the disclosure, the microscope-autofocus device can be configured as a discrete module, which can be added to an existing microscope including an imaging system with an objective. Available microscopes can be upgraded with the microscope-autofocus device with low costs. The microscope-autofocus device requires only reflective optics besides the monitoring beam source and the ETL and the detector device and can be implemented at a fraction of the cost required for a comparable piezo-based actuator.

According to a second general aspect of the disclosure, the above object is solved by a microscope apparatus, comprising an excitation light source, an imaging system with a microscope objective, a microscope photodetector and the microscope-autofocus device according to the above first general aspect of the disclosure. Advantageously, the ETL optically coupled to the microscope objective is adapted for readjusting the focal position after a drift variation of the objective distance, thus presenting a fast and cost effective all-optical autofocus solution. Due to the above main advantages, the disclosure can be implemented with various types of optical microscopes, like e. g. microscopes being configured for at least one of laser scanning confocal, multiphoton and wide field microscopy modes.

Preferably, the microscope objective and the electrically tunable lens have a numerical aperture equal to or greater than 1.45. In this case, advantages for total internal reflection mode microscopy (TIRF microscopy) are obtained.

According to a third general aspect of the disclosure, the above object is solved by an autofocus-control method for operating a microscope, including a feedback-control of a focal position of an imaging system of the microscope, wherein the imaging system includes a microscope objective and an ETL. The autofocus-control method, preferably being conducted with the inventive autofocus device, comprises the steps of creating a monitoring beam, directing the monitoring beam via the imaging system to the sample and back from the sample via the imaging system to a detector device, detecting a drift variation of an objective distance between the microscope objective and the sample by sensing the monitoring beam with the detector device, and feedback-controlling the imaging system in dependency on the detected objective distance variation of the microscope objective. According to the disclosure, the focal position of the imaging system is adjusted by varying a lens control input of the ETL, and the feedback-control of the imaging system includes controlling the lens control input of the ETL with a varying set-point value being determined by current values of the detected axial objective distance variation of the microscope objective and the lens control input and by calibration data derived from the mutual relationships of detector device output values to objective distance variation values and lens control input values.

Preferably, the calibration data are obtained by a calibration procedure, wherein the objective distance and the input to the electrically tunable lens are actuated in an ETL operation range, and the resulting detector output values are recorded and stored to provide the calibration data as a reference for a closed loop feedback operation of the autofocus device. In particular, the calibration procedure comprises collecting of measuring data, which include detector device output values in dependency on objective distance variation values, detector device output values in dependency on lens control input values, and detector device output values at focal positions of the imaging system with different objective distances in dependency on associated lens control input values. The measuring data are collected with a calibration sample. Subsequently, the calibration data are calculated from the collected measuring data. If, according to a particularly preferred embodiment of the disclosure, the measuring data can be represented by linear functions, the calibration data comprise proportionality factors providing the slopes of the linear functions. Otherwise, if the measuring data are represented by non-linear functions, the calibration data can be derived from local slopes of the non-linear functions.

Varying the set-point value preferably comprises ramping (stepwise increasing or decreasing) a current set-point value in dependency on the actual lens control input. Particularly preferred, the changing set-point value is calculated by multiplying the actual lens control input with the slope of the linear function of the device output values at focal positions of the imaging system with different objective distances in dependency on lens control input values.

According to a fourth general aspect of the disclosure, the above object is solved by a method of microscopic investigation of a sample, wherein the imaging system of the microscope apparatus, including an ETL, is controlled with the autofocus-control method according to the above third general aspect of the disclosure. The method of microscopic investigation includes the steps of preparing a sample, providing the sample at the microscope apparatus, presetting the microscope apparatus for bringing the sample into focus, and collecting sample image data, which can be implemented as it known as such from conventional microscopy. Subsequently, the inventive autofocus-control method is started for keeping the sample in focus.

According to a preferred embodiment of the disclosure, the feedback loop device is adapted for controlling the ETL in an operation range of the ETL, wherein the detector device output values have a linear relationship to the lens control input values. Advantageously, this facilitates the provision of the calibration data, the creation of a linearly varying set-point and the implementation of a PID control in the feedback loop device. It is noted that the feedback loop device alternatively can be adapted for controlling the ETL in another operation range, wherein the detector device output values have a non-linear relationship to the lens control input values. In this case, a non-linearly changing set-point can be used, optionally having advantages in terms of adjustment speed.

According to a further preferred embodiment of the disclosure, the detector device is adapted for continuously detecting the objective distance variation and providing detector device output values according to the actual objective distance variation. Accordingly, with this preferred embodiment of the inventive autofocus method, the objective distance variation is continuously detected. Continuously detecting the objective distance variation means that the detector device and an electrical detection circuit thereof are always in operation, thus providing the detector device output to the feedback control device permanently or at a predetermined detection rate, which is higher than the rate of controlling the lens control input by a factor of at least 5, preferably at least 10. The curvature of the ETL can then be readjusted by generating the lens control input, e. g. the input current, according to the calibration measurement and the control with the feedback circuit. As a result, with the continuous detection, the sample can be kept in focus without any mechanical movement, at rates up to hundreds of Hertz.

Particular advantages for the configuration of the microscope-autofocus device are obtained with a further preferred embodiment, wherein the detector device and the monitoring beam source are arranged for sensing the monitoring beam in a total internal reflection mode. The incoming monitoring beam is subjected to a total internal reflection at the coverslip and the reflected monitoring beam is subjected to a lateral displacement (preferably perpendicular to the beam path of the reflected monitoring beam) depending on the objective distance of the imaging system and the current lens control input value. Advantageously, the total internal reflection provides a non-diverging reflected monitoring beam, allowing a position of the detector device with a distance from the imaging system. Preferably, the distance of the detector device from the imaging system is larger than e. g. an axial extension of the imaging system. Particularly preferred, the detector device is arranged outside the microscope body. In this case, the reflected monitoring beam is coupled out of the microscope body, e. g. through a transmission window, to the detector device. This facilitates the microscope configuration in an advantageous and flexible manner.

According to a further advantageous embodiment of the disclosure, the detector device includes a position sensitive photodetector (photodetector creating an output signal being dependent on the position of the detected light on the photodetector). The position sensitive photodetector is arranged for sensing a lateral displacement of the reflected monitoring beam. Advantageously, this provides an improved precision of detecting a defocusing drift. Particularly preferred, the detector device includes a quadrant photodetector. By implementing the feedback control through a totally internally reflected monitoring beam, e. g. an IR laser beam, onto a quadrant photodetector, displacements of the reflected beam relate with high sensitivity to changes in objective to sample distance. Furthermore, the quadrant photodetector has an advantage as the signal is normalized to the total power detected on the receptor.

Features of preferred embodiments of the disclosure are described in the following with reference to details of a microscope being operated in total internal reflection mode (TIRF microscope) and being provided with a feedback-loop autofocus control based on the lateral position of a totally internally reflected infra-red laser monitoring beam on a quadrant photodetector, as an indicator of the relative defocus. The disclosure is not restricted to this embodiment, but rather can be implemented in modified manner, e. g. with other microscope types, like e. g. a conventional wide field microscope or a scanning microscope, with a normal reflection geometry of the monitoring beam, with an IR or visible monitoring beam and/or with another type of photodetector, like a CCD based line or field detector. Details of the microscope apparatus, like e. g. excitation light-sources, imaging optics, manual drivers of the imaging system or a monitoring display, and the operation thereof are not described as far as they are known as such from prior art microscopy.

Microscope Apparatus Including a Microscope-Autofocus Device

FIG. 1 schematically illustrates a microscope apparatus 200 being provided with a microscope-autofocus device 100 according to preferred embodiments of the disclosure. The microscope apparatus 200 comprises e. g. an inverted microscope (IX73, manufacturer Olympus, Japan), and it is provided with an excitation light source 210, an imaging system 220, including a microscope objective 221 and an ETL 140 (as a part of the microscope-autofocus device 100), a microscope photodetector 230, a microscope body 240 (supporting frame), further optical components 251-253, and a microscope control unit 260. The microscope-autofocus device 100 comprises a monitoring beam source 110, a detector device 120, a feedback loop device 130, and the ETL 140, wherein the feedback loop device 130 is arranged for adjusting the ETL 140.

The microscope excitation light source 210 comprises a laser diode (e. g. Cube 488 nm, manufacturer Coherent, Germany) creating an excitation beam 211 for irradiating the sample 1, e. g. for exciting fluorescence in biological cells. With a modified embodiment of a TIRF microscope, the excitation light source 210 can be arranged for coupling an excitation beam 211 via a separate prism (not shown) to the sample as it is known from (Trans-)TIRF microscopes.

The imaging system 220 is arranged for focussing the excitation beam 211 into the sample 1. A turret 253 to hold the imaging system is provided before the imaging system 220 allowing its mechanical axial actuation. Total internal reflection of the excitation beam 211 is achieved by an appropriate distance of beam 211 from the axis of the optical system. A 250 mm focal distance lens (not shown, manufacturer Thorlabs, USA) focuses the excitation beam 211 in the back focal plane of the microscope objective 221 (e. g. a 60x, 1.49 NA TIRF objective, manufacturer Olympus).

The ETL 140 is e. g. the lens EL-16-40-TC (manufacturer Optotune AG, Switzerland) with an outer diameter of 40 mm to 50 mm, as further shown in FIGS. 2 and 3. The focal length of the ETL 140 is adjusted by a lens control input comprising an input current supplied from the feedback loop device 130 to the ETL 140. Cover glasses of the ETL 140 are VIS coated in a wavelength range of 420 to 950 nm. The focal power ranges from −2 to 3 diopters. FIG. 2 shows the ETL 140 with two different input currents, which create different curvatures of an internal membrane surface 141 and correspondingly different effective focal lengths (as it is known from). The input current is supplied via an electrical interface 142 as shown with the perspective view of FIG. 3.

The microscope photodetector 230 is arranged for collecting fluorescence images of the sample 1 by sensing fluorescence light 212 emitted from the sample, and it comprises e. g. a Cascade II 512 EMCCD camera (manufacturer Photometrics, USA). Image data are transmitted to the microscope control unit 260, which is adapted for controlling the microscope apparatus 200 and processing the image data received from the microscope photodetector 230. Additionally, the microscope control unit 260 is coupled with the feedback loop device 130 for controlling the operation thereof.

The lower deck of the IX73 microscope body, where the fluorescence filter turret is normally positioned, is used to install the optical feedback setup of the microscope-autofocus device 100. The monitoring beam source 110 is a single mode pigtailed laser diode with a wavelength of 776.7 nm, a fiber type of 780HP powered by an OEM Laser Diode Driver Evaluation Kit EK2000 (manufacturer Thorlabs, USA).

The detector device 120 is a quadrant photodiode (QPD) MTQD5.8PV1-5 (manufacturer Marktech Optoelectronics, USA) having a peak sensitivity wavelength of 940 nm. The QPD is coupled with an electrical detection circuit 121, which is assembled based upon transimpedance, difference and sum amplifiers. Analog signals were generated and acquired through a NI DAQ 6363 Card (manufacturer National Instruments, USA).

The feedback loop device 130 is a control circuit including the inventive feedback algorithm, which is programmed in LabView (National Instruments, USA). The electrical detection circuit 121 of the detector device 120 supplies detector device output values to the feedback loop device 130, which creates the input current of the ETL 140 on the basis of a varying setpoint value. The preferably linearly varying set-point value is determined by actual values of the detected objective distance variation (represented by the detector device output values) and the lens control input and by calibration data as outlined below. The calibration data derived from the assignment of detector device output values to objective distance variation values and lens control input values are stored in a calibration data storage being included in the feedback loop device 130 or in the microscope control unit 260.

The monitoring beam 111 (IR laser beam) of the microscope-autofocus device 100 enters through the side of the lower deck of the microscope body 240 and is reflected by 0.5" mirrors (manufacturer Thorlabs, USA) through the periphery of an 1" aperture of a filter cube 251 holding a dichroic mirror (ET 488/561, manufacturer Chroma, USA), aligned to the optical axis of the microscope apparatus 200. From here it enters the imaging system 220 including the combined ETL 140 and microscope objective 221 block. The monitoring beam 111 is then totally internally reflected at the coverslip-sample interface and the reflected beam 112 is collected on the other side of the aperture of the dichroic filter cube 251 and steered via an auxiliary mirror 252 onto the detector device 120. The electrical detection circuit 121 converts the QPD signal into a voltage, which is then read in the software feedback algorithm which returns a current output signal to the ETL 140.

FIGS. 4A and 4B schematically illustrate the working principle of detecting the reflected monitoring beam 112 with the detector device 120. The quadrant photodetector of the detector device 120 as such comprises four sensitive areas. For implementing the detection principle, two sensitive areas are sufficient which are arranged adjacent to each other along the direction of lateral beam translation when the focal position of the imaging system 220 changes. Therefore, the upper sensitive areas are combined for providing a first output signal (TOP), and the lower sensitive areas are combined for providing a second output signal (BOTTOM). The detector device output value QPD (V) is an electrical voltage, which is calculated according to the equation $$QPD(V)=(TOP-BOTTOM)/(TOP+BOTTOM).$$

Depending on the translation direction of the reflected monitoring beam 112, the detector device output value has a positive or negative sign. Due to this detection principle, the quadrant photodetector can be replaced by a photodetector having two sensitive areas only, e. g. two photodiodes, or a camera detector.

The reflected monitoring beam 112 exits through the ETL 140 hitting the quadrant photodetector of the detector device 120 in a distinct position which depends on two parameters as shown in FIGS. 4A and 4B. According to FIG. 4A, the detector device output value QPD (V) depends on the physical objective 221 to sample 1 distance (objective distance). With the occurrence of a drift variation of the focal position in the sample 1 due to e. g. a mechanical drift of the objective 221, e. g. with an increasing objective distance, the detector device output value QPD (V) changes, e. g. to a negative value. According to FIG. 4B, the detector device output value QPD (V) further depends on the input current applied to the ETL 140. With a changing input current for compensating a drift variation of the focal position in the sample 1, the detector device output value QPD (V) changes as well.

In consideration of the following features of the imaging system 221 and the detector device 120, the inventive microscope-autofocus device 100 is capable of a reliable autofocus feedback control taking both effects into account.

Autofocus-Control Method-Calibration

FIGS. 5 to 8 illustrate the mutual relationships between the detector device output values, the objective distance variation values and the lens control input values, allowing the provision of calibration data for the inventive autofocus feedback control with varying set-point.

In order to establish the relationships between detector device output changes and (i) objective-to-sample physical displacement and (ii) ETL input current, a calibration sample made of e. g. 100 nm diameter fluorescent microspheres (e. g. Tetraspeck beads, manufacturer ThermoFisher, USA) is used. For the inventive autofocus control, the difference between a setpoint value for the detector device output and the actually measured detector device output (QPD voltage) is regulated. To convert the difference between the measured QPD voltage and the setpoint into a focal change of the imaging system 220, the microscope-autofocus device 100 uses calibration data. However, both physical axial position and input current changes (physical lens deformations) give rise to a QPD 120 output voltage change. The separate effects of these two factors (QPD vs displacement) and (QPD vs current) are illustrated in FIGS. 5 and 6.

Figure 5:
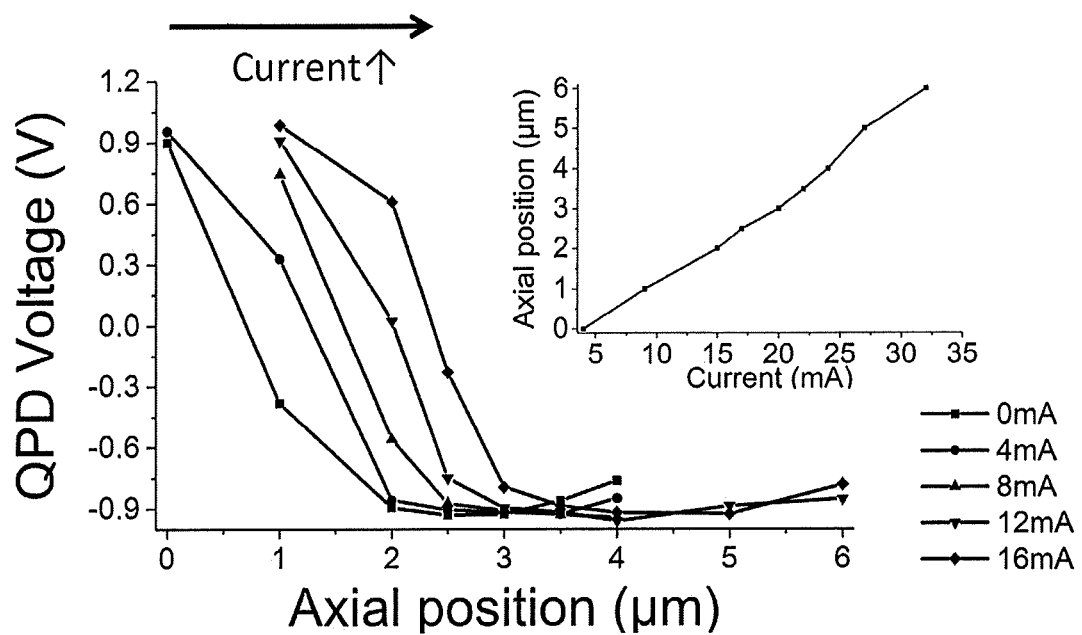
FIGS. 5 to 8: graphical illustrations of relations between detector device output values, objective distance variation values and lens control input values of the inventive microscope autofocus device.

FIG. 5 shows the detector device output (QPD voltage) in dependency on an axial position of the microscope objective 221 for constant input currents to the ETL 140. As shown in FIG. 4A, with a drift variation of the axial position of the microscope objective, i. e. the objective distance, the detector device output changes from positive to negative values following a shift from the top to the bottom sensitive area of the detector device 120. A family of curves results from different ETL input current values being concurrently and continuously applied. Simultaneously, the inlay of FIG. 5 shows a linear relationship between the axial position and the input current, while keeping a certain focal condition, in particular the focal position of the imaging system 220.

Figure 6:
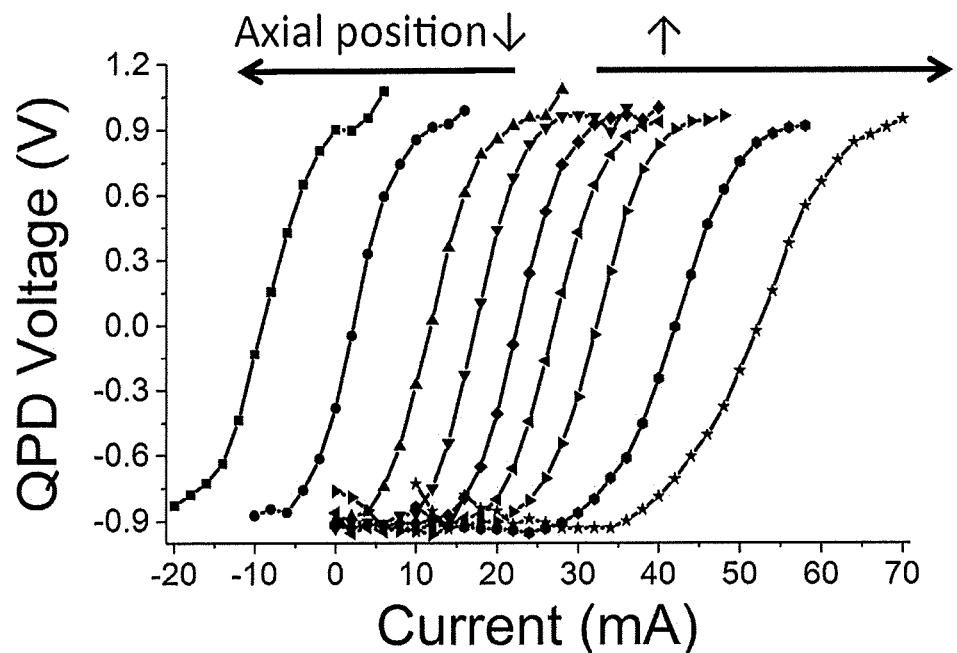

FIG. 6 shows the detector device output (QPD voltage) in dependency on the input current for distinct displacements. For each change in objective distance (e. g. physical displacement along microscope axis), in steps of 500 nm to 1 µm, a QPD voltage vs ETL 140 input current characteristic curve is collected. The curves shift to the left or right by changing the objective distance between microscope objective 221 and the coverslip. A specific requirement of the inventive autofocus control is that the set-point prediction takes into account also the changes in detector device output arising whenever a new input current is applied to the ETL 140.

Figure 7:
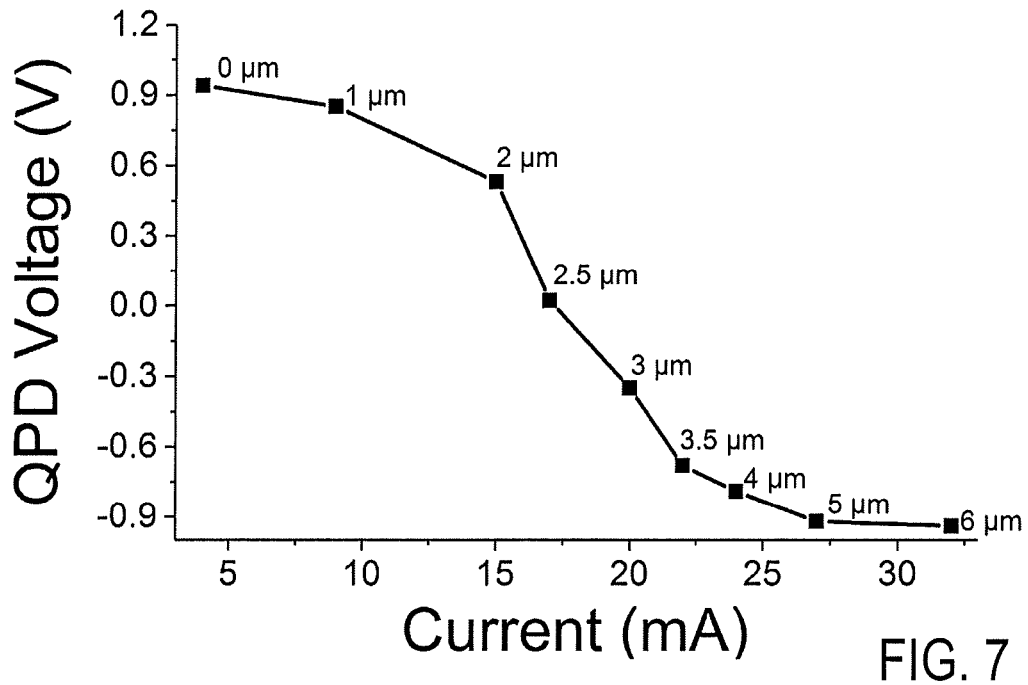

According to FIG. 7, which shows the detector device output in dependency on the input current at each in-focus position of the ETL 140, the detector device output (QPD voltage) has a linear dependency on the applied input current, within a specific operation range, in particular within a specific input current range of the ETL. In the considered example, the linear operation range covers input currents from 15 to 24 mA. This facilitates to adjust the set-point value for the QPD both as a function of the displacement as well as of the instant current applied to the lens.

Figure 8:
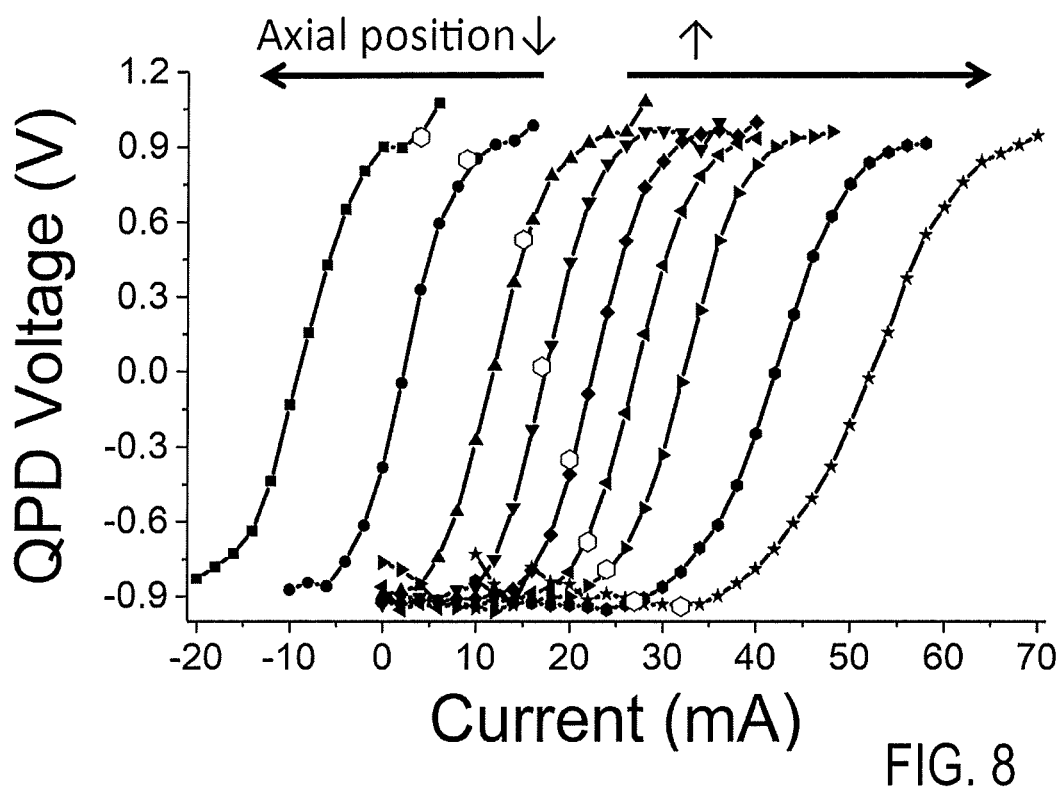

FIG. 8 shows the same curves like FIG. 6, but with an indication of hexagonal dots representing the in-focus points of each curve, i.e. the values for which the focus adjustment is correct. FIG. 8 also indicates that detector device output values for changes in objective distance of less than 750 to 1000 nm shift linearly as a function of the applied input current required to bring the sample 1 back in focus. In this case, a feedback with linear set-point ramping is provided, i.e. where the set-point (QPD target voltage associated to focus) changes linearly as a function of the applied input current. Feedback control with linear set-point ramping is described with reference to another control task. The focal position is determined, for each displacement and current value, by bringing individual beads into focus. Feedback parameters in the PID can be selected as required.

When the imaging system is operated in focus at a certain axial position (or microscope objective distance from the sample) and with a certain input current of the ETL 140, the detector device 120 provides a specific (initial) detector device output given by the curve of FIG. 7. If a drift variation of the microscope objective distance occurs, so that the correct focal position is abandoned, and the detector device output changes, the initial detector device output cannot be used as a fixed set-point value: the new axial position of the imaging system 220 requires changing the input current for keeping the focal position, so that a new set-point for detector device output is required as well. This is obtained by the calibration data, which are collected as shown in FIGS. 9 and 10.

Figure 9:
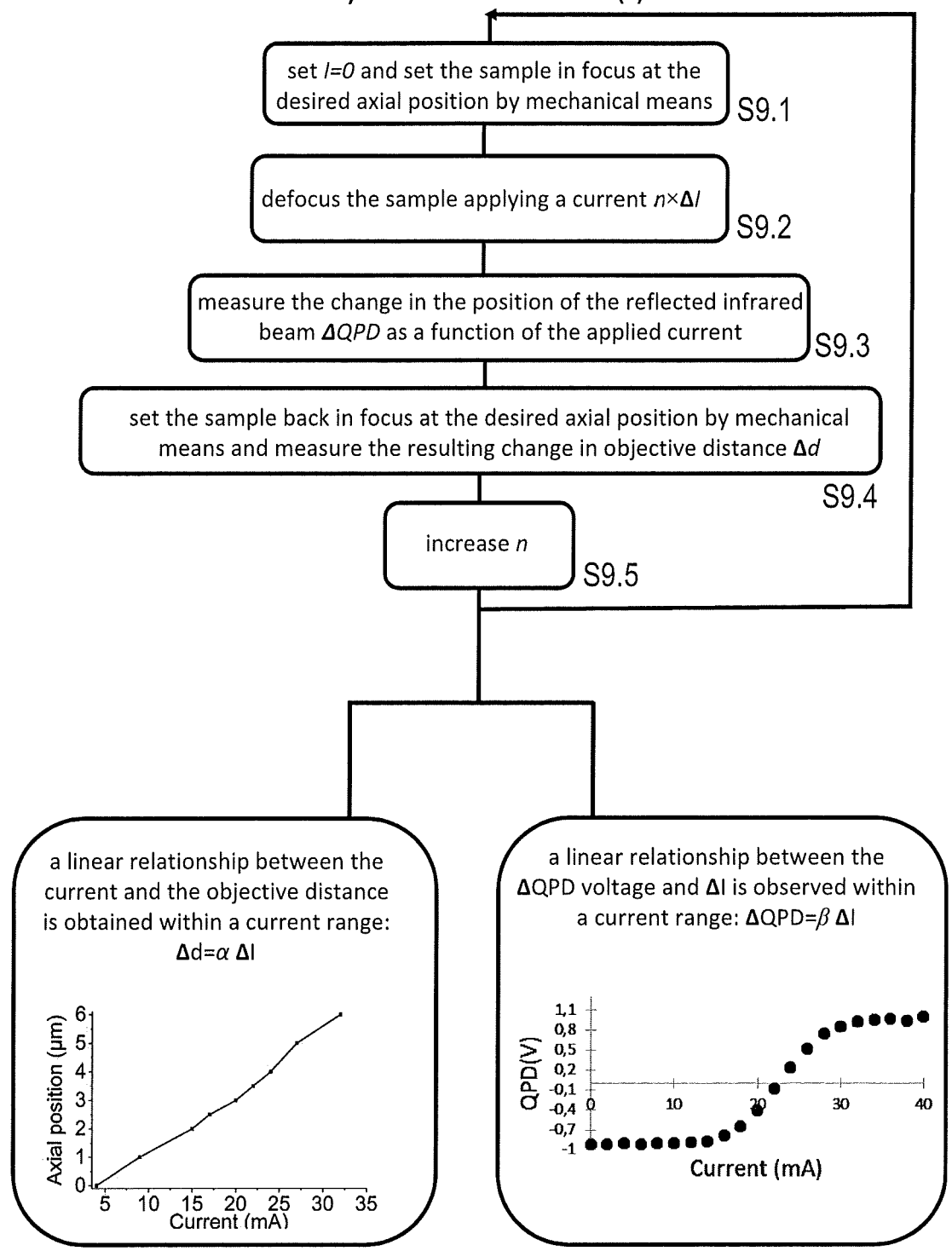
FIGS. 9 and 10: flowcharts illustrating the calibration of the inventive microscope autofocus device.

According to FIG. 9, the calibration curves of FIG. 5 (inlay) and FIG. 8 (full symbols) are collected by the following steps. Firstly, the input current of the ETL 140 is set to zero and the imaging system 220 is focused to the sample 1 by adjusting the axial position of the imaging system 220 (step S9.1, e. g. manual adjustment). The focal position is found by monitoring the image of a calibration sample or by a software-based image analysis. The input current is increased stepwise by predetermined current steps $\Delta I$, resulting in a defocusing of the sample 1 (step S9.2). Changing the input current results in a change of the detector device output $\Delta QPD$ (see FIGS. 4A and 6), which is measured and recorded (step S9.3). Subsequently, the sample is set in focus again by manually translating the imaging system 220, while the change in objective distance $\Delta d$ required for focusing is measured (step S9.4), e. g. with the mechanical control of the microscope (read-out with a precision of e. g. 0.5 nm to 50 nm). The parameter n (n: natural number 1, 2, . . . ) is increased until the operation range of the imaging system 220 is covered (step S9.5). As the result of this first calibration measurement, the proportionality factors $\alpha$ and $\beta$ in the calibration curves $\Delta d=\alpha\Delta I$ and $\Delta QPD=\beta\Delta I$ are obtained.

Figure 10:
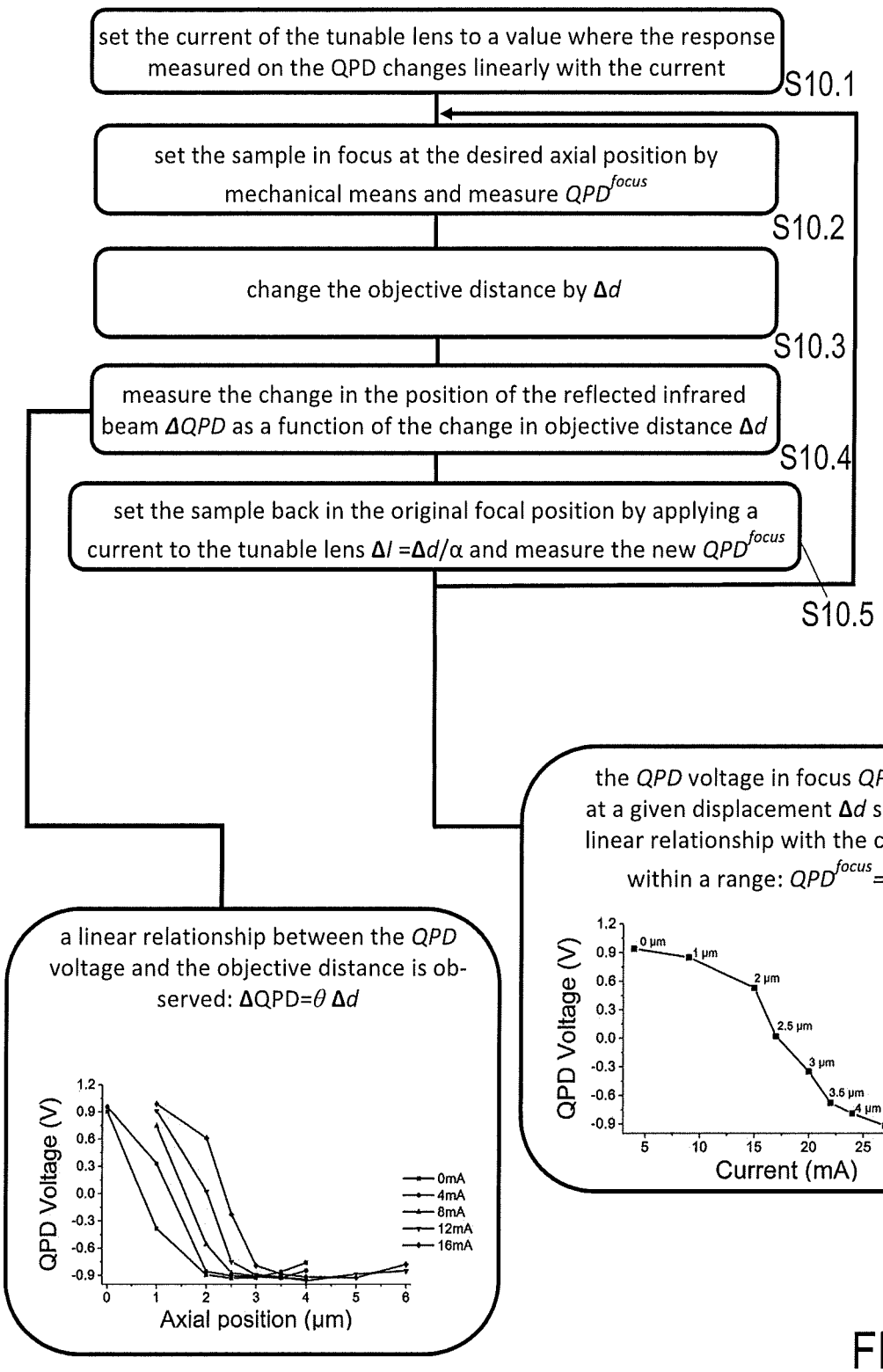

Subsequently, the calibration curves of FIG. 5 and FIG. 7 are collected by the following steps, as shown in FIG. 10. Firstly, the input current of the ETL 140 is set in the range, where the detector device output changes linearly with the current (FIG. 8) (step S10.1). The imaging system 220 is focused to the sample 1 by manually adjusting the axial position of the imaging system 220, and the associated detector device output $QPD^{focus}$ is measured (step S10.2). After changing the microscope objective distance by a predetermined step $\Delta d$ (step S10.3), the change of the associated detector device output $\Delta QPD$ is measured (step S10.4). Subsequently, the sample is set back to focus by changing the input current according to $\Delta I=\Delta d/\alpha$, and the new detector device output $QPD^{focus}$ is measured (step S10.5). The steps S10.1 to S10.5 are repeated for a predetermined number of steps $\Delta d$, resulting in the proportionality factors $\theta$ and $\gamma$ in the calibration curves $$\Delta QPD^{focus}=\theta\Delta d \text{ and } \Delta QPD^{focus}=\gamma I.$$

Microscopy Method Including Autofocus Feedback Control

Figure 11:
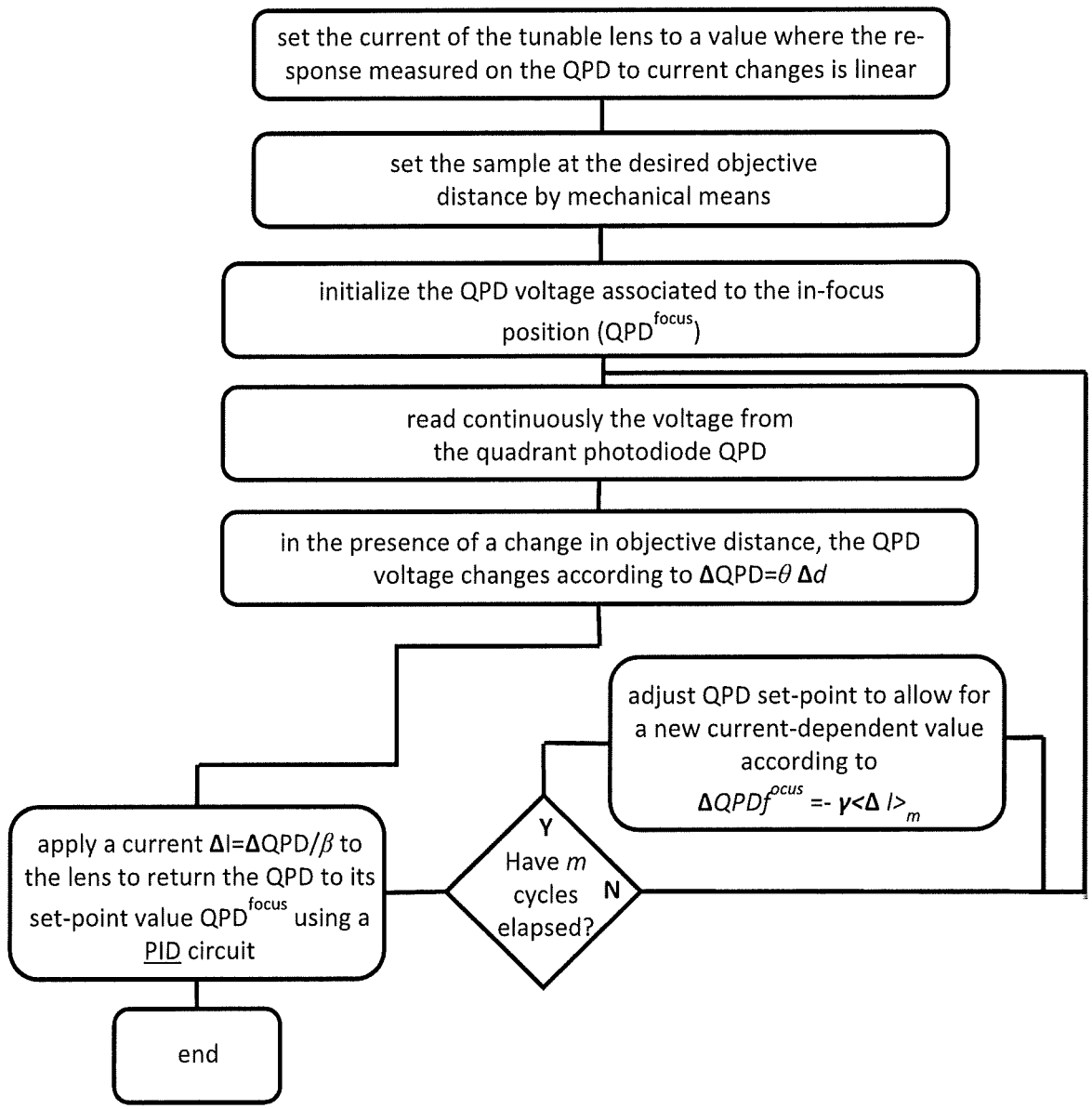
FIG. 11: a flowchart illustrating the feedback control of the ETL with a varying set-point.
Figure 12D:
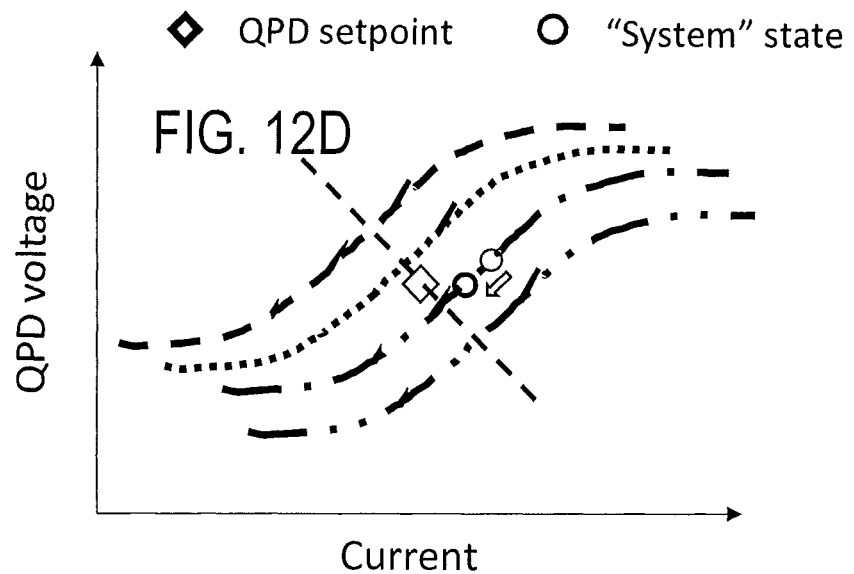
Figure 12E:
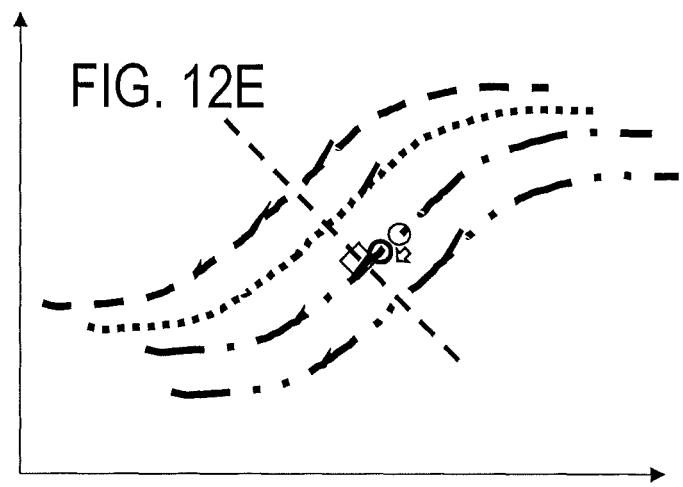
Figure 12F:
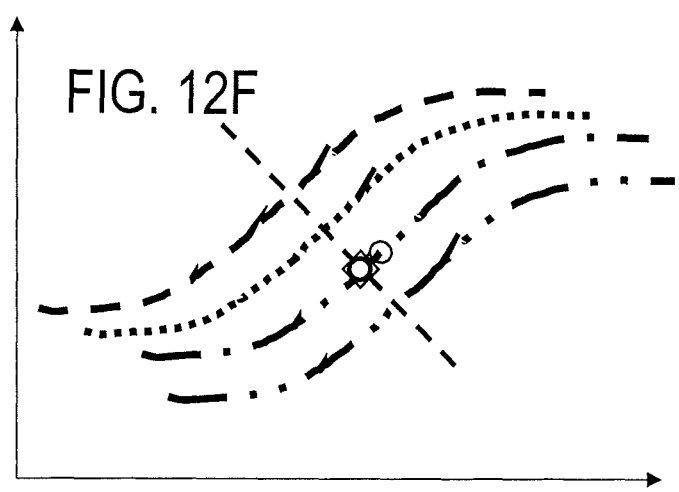

The calibration of FIGS. 9 and 10 is conducted once for a given microscope set-up of the imaging system 220 and the microscope-autofocus device 100. As a result, the calibration data, in particular the proportionality factors α, β, θ and γ, assign detector device output values to objective distance variation values and lens control input values. Using the proportionality factors α, β, θ and γ of the calibration procedure, the feedback autofocus control of the imaging system 220 is conducted in microscopic imaging of a sample under investigation with linearly varying set-point, as shown in FIG. 11 and further exemplified in FIGS. 12A to 12F. The microscopic imaging method includes positioning of the sample on a support holder of the microscope body 240 and pre-setting the microscope apparatus 200 for bringing the sample into focus. Subsequently, image data of the sample are collected while the focus position is controlled automatically, as shown with the flowchart of FIG. 11. FIGS. 12A to 12F illustrate successive stages of this feedback control procedure.

According to FIG. 11, the input current of the ETL 140 is set in the range, where the detector device output changes linearly with the current (FIG. 8) (step S11.1). The imaging system 220 is focused to the sample under investigation, e. g. by manual adjustment, (step S11.2) and the associated value $QPD^{focus}$ is recorded as initial detector device output (step S11.3). The initial detector device output $QPD^{focus}$ is the set-point for the actual input current value (see FIG. 12A). The detector device output is continuously read by the feedback loop device 130 (FIG. 1) (step S11.4).

If a drift variation of the microscope objective distance occurs, the detector device output changes according to $\Delta QPD^{focus}=\theta\Delta d$ (step S11.5) (see FIG. 12B). An input current change ΔI is applied for changing the focal position of the imaging system 220 back to the sample (see FIG. 12C). The input current change $\Delta I=\Delta QPD/\beta$, which is known from calibration of FIG. 9 is applied using a PID control included in the feedback loop device 130 (step S11.6).

Basically, steps S11.1 to S11.6 are similar to conventional feedback control methods. As an example, in a conventional monitoring beam based autofocus system, the objective is translated until a detector device output representing the focal position is recovered. However, as the input current influences the detector device output, when using the ETL 140, the detector device output representing the focal position is changing, so that a variation of the set-point is introduced (see FIGS. 12D to 12F) as follows, in particular using the calibration curve of FIG. 7.

The set-point of the detector device output is ramped with steps S11.7 and S11.8. The process of changing the input current and the process of ramping the set-point of the detector device output occur on different time scales. Therefore, the rate of ramping the set-point is slower than the rate of changing the input current. As an example, step S11.6 is repeated at a rate of about 200 Hz, while the set-point of the detector device output is changed every 100 ms only, i.e. at a rate of 10 Hz. Therefore, it is tested with step S11.7, whether a number m, e. g. 100 cycles have been elapsed. Steps S11.4 to S11.6 are repeated for the number of measuring cycles at the measuring rate of e. g. 200 Hz (step S11.7). When the number of measuring cycles, i. e. a predetermined time interval, has elapsed, the new set-point is set (change of set-point) with the actual input current according to $\Delta QPD^{focus}=-\gamma\Delta I$ with the proportionality factor γ known from the calibration (step S11.8). The input current I can be the instant current applied to the ETL 140 or, preferably, a moving average of the current applied in the previous time interval. Using the changed $\Delta QPD^{focus}$, the applied input current is changed with step S11.6 (see arrow in FIG. 12D). The loop of steps S11.8 and S11.6 is repeated for step-wise ramping the QPD set-point, until the QPD set-point represents the in-focus position with the actual input current (see FIGS. 12E and 12F). The new $QPD^{focus}$ is obtained iteratively as with each change of the QPD set-point, the change of the input current is decreased, again resulting in a decreased change of the QPD setpoint. Thus, the set-point of the detector device output (QPD voltage) is matched to the new $QPD^{focus}$ by changing the set-point along the straight line spanned by the hexagonal dots of FIG. 8 (see dashed straight line in each of the images of FIGS. 12A to 12F).

EXPERIMENTAL RESULTS

Imaging results using the inventive autofocus control method are presented in an exemplary manner in FIGS. 13 to 19C. After storing the calibration data, fluorescent beads immobilized on a glass coverslip were imaged to demonstrate the actual performance of the autofocus control.

Figure 13:
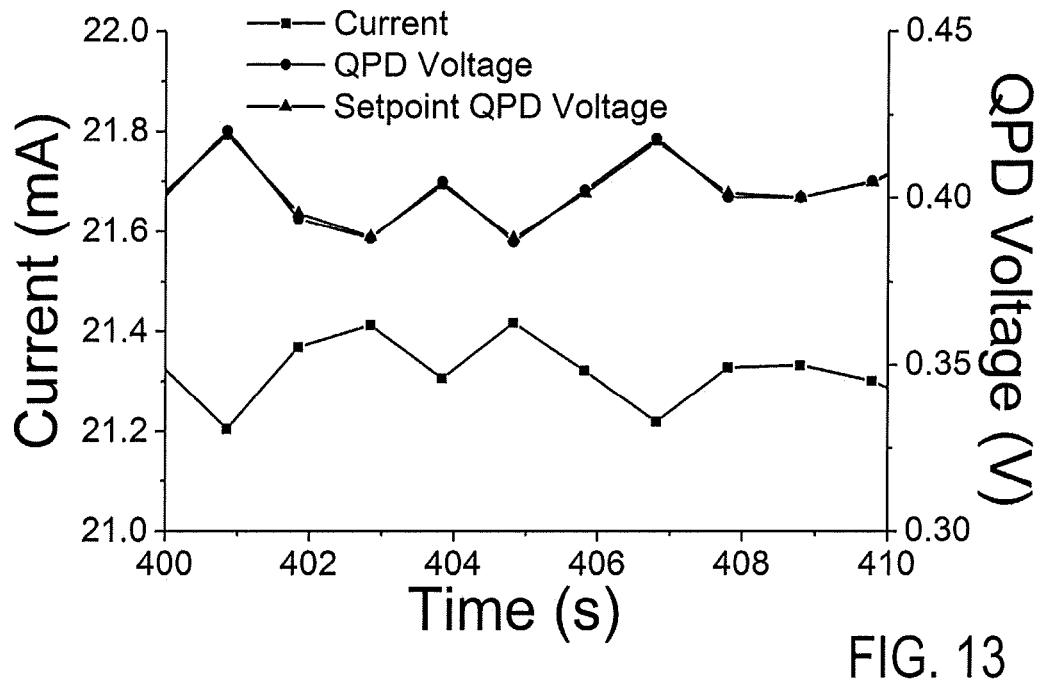
Figure 14:
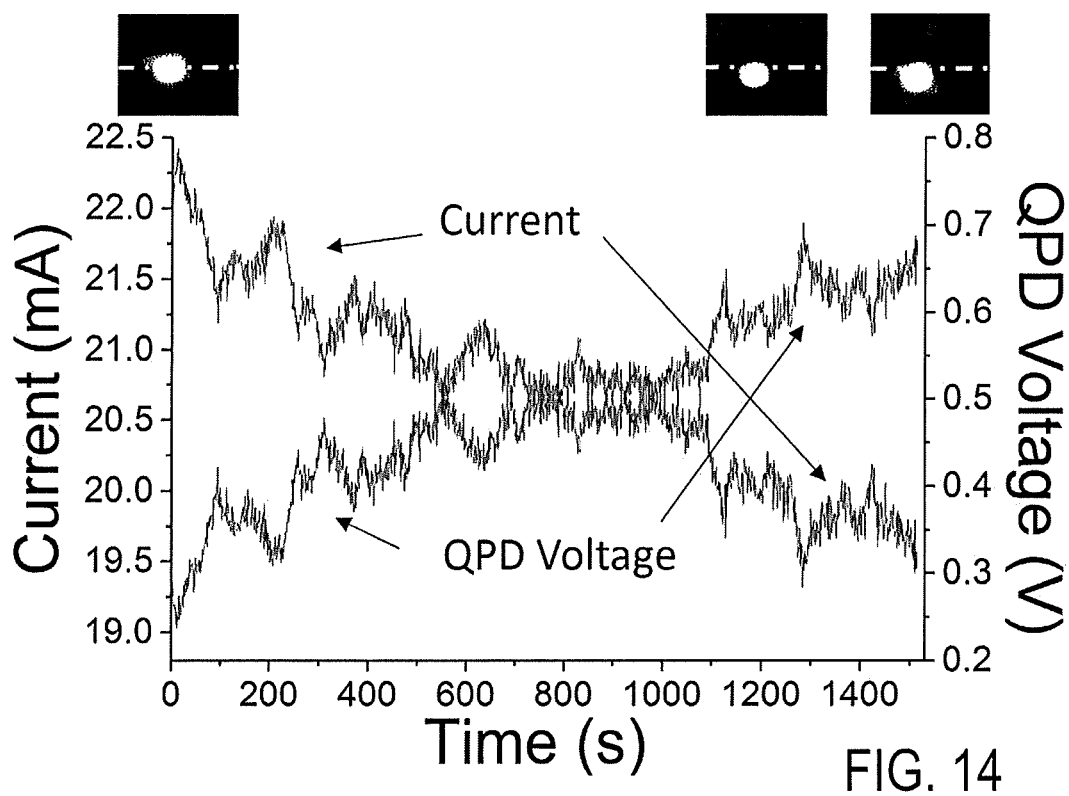
Figure 16A:
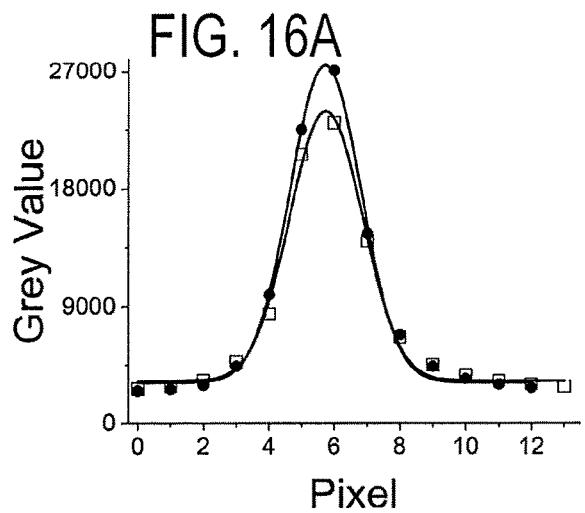
Figure 16:
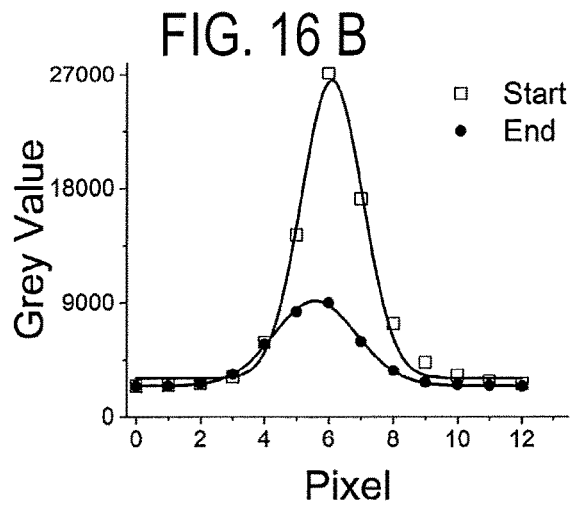

FIG. 13 shows the performance of the autofocus demonstrating how the detector device 120 output (QPD voltage) follows the set-point QPD voltage (magnified time course). It also shows the input current trace for the lens. In FIG. 14, the top displays show images of one bead taken at fixed time intervals over 25 minutes. The lines indicate where the profiles shown in FIG. 16A were collected. White line indicates where the profile in FIG. 16A was measured. FIG. 14, bottom, shows traces of the QPD voltage and the ETL current as a function of time: the traces, as expected, are mirrored and illustrate the readjustment that the feedback performs as result of the focal drift.

Figure 15:
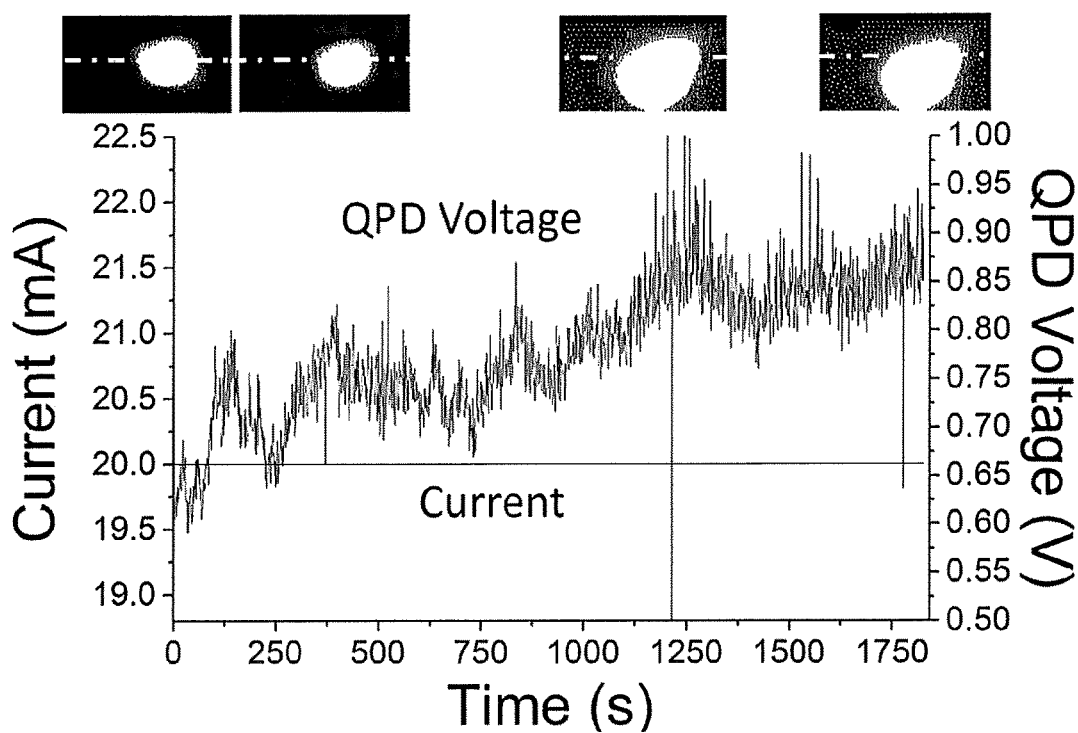

FIG. 15 shows a fluorescent bead over a time series of 30 min with disabled feedback, thus representing the same as in FIG. 14, but without autofocusing. The input current to the lens is constant, while the QPD voltage drifts as a function of mechanical defocus alone. The images of the bead in FIG. 15 top show that the microscope looses focus over time. The QPD voltage drifts upwards as the objective displaces from its location. This is quantitatively illustrated in FIGS. 16A and 16B, where the line-profiles across the beads with and without enabled feedback are respectively illustrated. The standard deviation of a fitting Gaussian curve (as a best approximation to the microscope Point Spread Function) is an indicator of the focus. The inventors compared the width at time 0 to the width after 25 min with enabled autofocus and 30 min with disabled autofocus. The deviation from the start width with disabled feedback was 30% whereas the deviation from the starting width with enabled autofocus feedback was 3%, confirming the autofocusing performance of the device and method.

Figure 17:
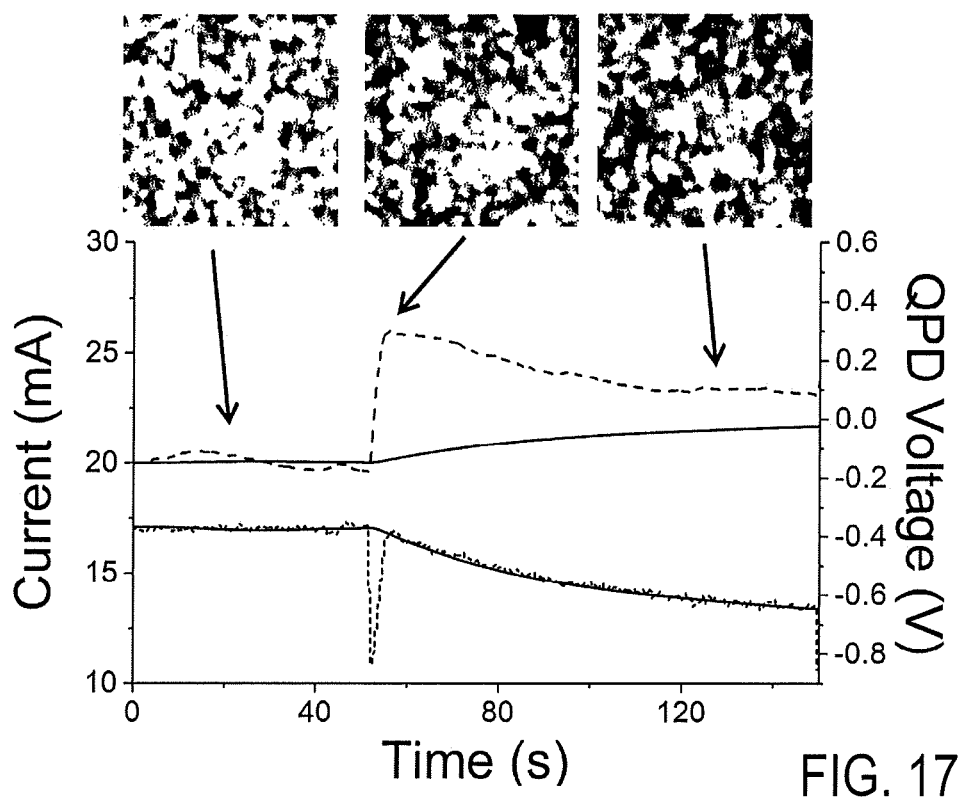

FIGS. 17 to 19C show traces and images of enabled autofocus. Top images of FIG. 17 show fluorescent beads. To further characterize the performance of the all-optical autofocus, the inventors manually changed the distance between the objective and the sample rapidly, in order to test the ability of the setup to regain focus in response to a sudden perturbation. Thus, the lower portion of FIG. 17 shows traces for the QPD voltage and the input current for a low proportional PID value and an extended averaging of the current I to calculate the new setpoint value according to $\Delta QPD^{focus}=\gamma I$. Current and QPD voltage recover slowly after manual displacement of objective of about 500 nm. The response shows that the current as well as the QPD voltage converge towards a new in focus point. Because of the averaging of the current this happens with a long time constant.

Figure 18:
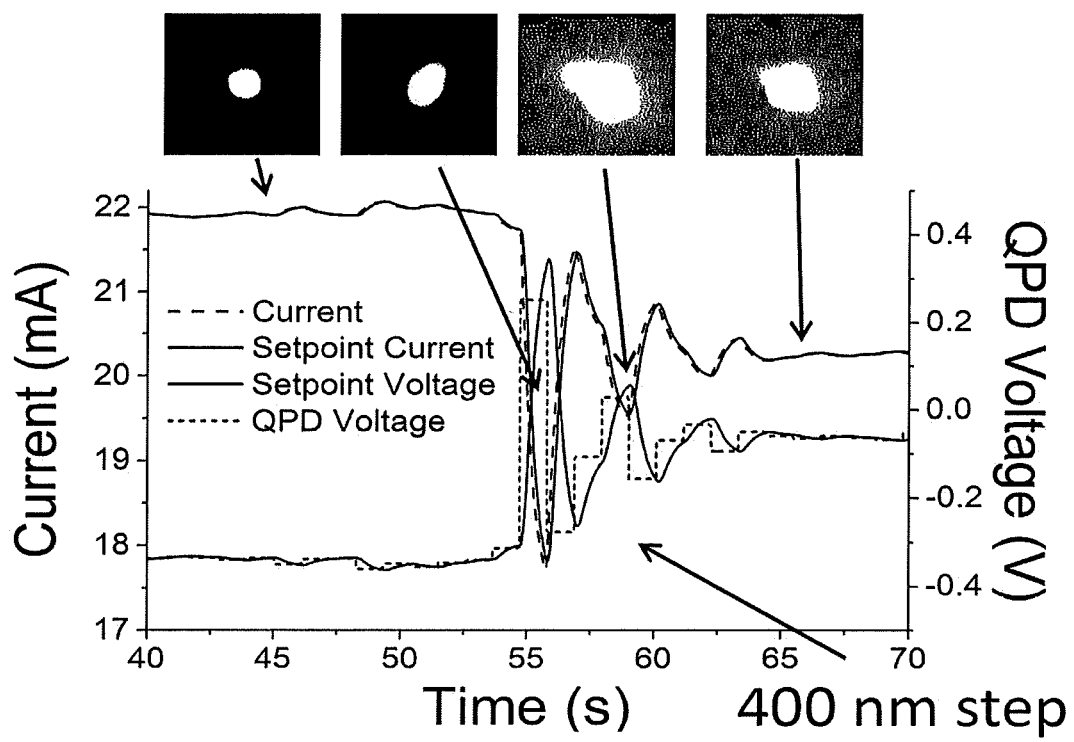

FIG. 18 shows the same as in FIG. 17, with a proportional term and with an additional integral constant. The graphs show a faster focus recovery. The moving average of the current is reduced in this case. The response to the step is more rapid, including characteristic oscillations as the QPD values converges to the new in-focus value. Both FIGS. 17 and 18 (top) display the images of the beads before, during and after the jumps.

According to FIGS. 19A to 19C, Hek293AD cells expressing a mitochondrially targeted dye (Mitotracker, manufacturer Thermofisher, USA), are imaged over 30 minutes with enabled autofocus. The left image (FIG. 19A) shows the cell at time 0 and the right image (FIG. 19B) after 30 min. FIG. 19C shows traces of the current and QPD voltage over time to keep the cell in focus.

The features of the disclosure disclosed in the above description, the drawings and the claims can be of significance individually, in combination or sub-combination for the implementation of the disclosure in its different embodiments.

Although the apparatus and methods have been described in connection with specific forms thereof, it will be appreciated that a wide variety of equivalents may be substituted for the specified elements described herein without departing from the spirit and scope of this disclosure as described in the appended claims.

The invention claimed is:

1. A microscope-autofocus device, being adapted for feedback-controlling a focal position of an imaging system of a microscope apparatus, wherein the imaging system includes a microscope objective, the microscope-autofocus device comprising:
a monitoring beam source configured to generate a monitoring beam, the monitoring beam directed through the imaging system to a sample and reflected by the sample through the imaging system to form a reflected monitoring beam, the monitoring beam source separate from an excitation light source of the imaging system,
a detector device comprising at least one photodetector, the detector device configured to detect a drift variation of an axial objective distance between the microscope objective and the sample by sensing a position of the reflected monitoring beam on the photodetector,
an electrically tunable lens coupled to the microscope objective, the electrically tunable lens configured to adjust the focal position of the imaging system responsive to a lens control input, and
a feedback loop device in communication with the detector device and the electrically tunable lens, the feedback loop device configured to generate the lens control input and provide the lens control input to the electrically tunable lens responsive to the detected drift variation, thereby controlling the focal position of the imaging system,
wherein the feedback loop device is configured to adjust the lens control input based on the detected drift variation and a set-point value of the electrically tunable lens, the feedback loop device further configured to vary the set-point value to account for an impact on an output of the detector device to changes in the lens control input, the varying of the set-point value being determined based on the detected drift variation, a present value of the lens control input and calibration data, the calibration data configured to assign detector device output values to predefined objective distance variation values, predefined lens control input values, wherein the calibration data are stored in a calibration data storage coupled with the feedback loop device.

2. The microscope-autofocus device according to claim 1, wherein
the feedback loop device is adapted for controlling the electrically tunable lens in an operation range, wherein the detector device output values have a linear relationship to the predefined lens control input values.

3. The microscope-autofocus device according to claim 1, wherein
the detector device is adapted for continuously detecting an objective distance variation and providing the detector device output values at a predetermined detection rate.

4. The microscope-autofocus device according to claim 1, wherein
the detector device and the monitoring beam source are arranged for sensing the monitoring beam in a total internal reflection mode, wherein an incoming monitoring beam is subjected to a total internal reflection at the sample and the reflected monitoring beam has a lateral displacement in dependency on the objective distance of the imaging system and a current lens control input value.

5. The microscope-autofocus device according to claim 4, wherein
the detector device includes a position sensitive photodetector configured to create an output signal dependent on the position of the detected light on the photodetector.

6. The microscope-autofocus device according to claim 5, wherein
the detector device includes a quadrant photodetector.

7. The microscope-autofocus device according to claim 1, wherein
the monitoring beam source is arranged for creating a light beam as the monitoring beam, wherein the light beam has a wavelength different from a wavelength or wavelength range used for microscopic imaging with the microscope apparatus.

8. The microscope-autofocus device according to claim 7, wherein
the monitoring beam source is arranged for creating a laser light beam as the monitoring beam.

9. A microscope apparatus, comprising
an excitation light source, an imaging system with a microscope objective, and a microscope photodetector, and
the microscope-autofocus device according to claim 1.

10. The microscope apparatus according to claim 9, wherein
the detector device of the microscope-autofocus device is arranged with a distance from the imaging system.

11. The microscope apparatus according to claim 9, wherein
the microscope apparatus is configured for at least one of laser scanning confocal, multiphoton and wide field microscopy modes.

12. The microscope apparatus according to claim 9, wherein
the monitoring beam source is arranged for creating a laser light beam as the monitoring beam, wherein the laser light beam has a wavelength different from a wavelength or wavelength range used by the excitation light source for microscopic imaging with the microscope apparatus.

13. An autofocus-control method for operating a microscope apparatus, including a feedback-control of a focal position of an imaging system of the microscope apparatus, wherein the imaging system includes a microscope objective, the method comprising the steps of:
- generating, by a monitoring beam source, a monitoring beam, the monitoring beam being directed through the imaging system to a sample and reflected by the sample through the imaging system to form a reflected monitoring beam, the monitoring beam source separate from an excitation light source of the imaging system,
- detecting, by a detector device comprising at least one photodetector, a drift variation of an objective distance between the microscope objective and the sample by sensing a position of the reflected monitoring beam on the photodetector,
- adjusting, by an electrically tunable lens coupled to the microscope objective, the focal position of the imaging system responsive to a lens control input,
- generating, by a feedback loop device in communication with the detector device and the electrically tunable lens, the lens control input and provide the lens control input to the electrically tunable lens responsive to the detected drift variation, thereby controlling the focal position of the imaging system,
- adjusting, by the feedback loop device, the lens control input based on the detected drift variation and a set-point value of the electrically tunable lens, the adjusting including varying the set-point value to account for an impact on an output of the detector device to changes in the lens control input, the varying of the set-point value being determined based on the detected drift variation, a present value of the lens control input and calibration data, the calibration data configured to assign detector device output values to predefined objective distance variation values, predefined lens control input values, wherein the calibration data are stored in a calibration data storage coupled with the feedback loop device.

14. The autofocus-control method according to claim 13, wherein
the electrically tunable lens is controlled in an operation range, wherein the detector device output values have a linear relationship to the predefined lens control input values.

15. The autofocus-control method according to claim 13, wherein
an objective distance variation is continuously detected and the detector device output values are provided at a predetermined detection rate.

16. The autofocus-control method according to claim 13, wherein
the monitoring beam is sensed in a total internal reflection mode, wherein an incoming monitoring beam is subjected to a total internal reflection at the sample and the reflected monitoring beam has a lateral displacement in dependency on a focus position of the microscope objective and a current lens control input value.

17. The autofocus-control method according to claim 16, wherein
the reflected monitoring beam is sensed with a position sensitive photodetector configured to create an output signal dependent on the position of the detected light on the photodetector.

18. The autofocus-control method according to claim 17, wherein
the reflected monitoring beam is sensed with a quadrant photodetector.

19. The autofocus-control method according to claim 13, wherein the calibration data are created by a calibration procedure, including
- collecting measurement data representing relationships between the detector device output values and the predefined objective distance variation values, the detector device output values and the predefined lens control input values, and the detector device output values at focal positions of the imaging system with different objective distances and the predefined lens control input values, wherein a calibration sample is used, and
- calculating the calibration data from the collected measurement data.

20. The autofocus-control method according to claim 13, wherein
the monitoring beam source creates a light beam as the monitoring beam, wherein the light beam has a wavelength different from a wavelength or wavelength range used for microscopic imaging with the microscope apparatus.

21. The autofocus-control method according to claim 20, wherein
the monitoring beam source creates a laser light beam as the monitoring beam.

22. A microscopy method, comprising the step of
investigating a sample with a microscope apparatus, wherein
the imaging system of the microscope apparatus is controlled with the autofocus-control method according to claim 13.

* * * * *